United States Patent
Junkins et al.

(10) Patent No.: US 6,266,142 B1
(45) Date of Patent: Jul. 24, 2001

(54) NONCONTACT POSITION AND ORIENTATION MEASUREMENT SYSTEM AND METHOD

(75) Inventors: John L. Junkins; Delcan Hughes, both of College Station, TX (US); Hanspeter Schaub, Tijeras, NM (US)

(73) Assignee: The Texas A&M University System, College Station, TX (US)

(*) Notice: Subject to any disclaimer, the term of this patent is extended or adjusted under 35 U.S.C. 154(b) by 0 days.

(21) Appl. No.: 09/399,992

(22) Filed: Sep. 20, 1999

Related U.S. Application Data
(60) Provisional application No. 60/101,386, filed on Sep. 21, 1998.

(51) Int. Cl.[7] .................................................. G01B 11/14
(52) U.S. Cl. ...................... 356/375; 701/28; 250/559.14
(58) Field of Search ......................................... 356/375, 376, 356/141.5, 139.03, 138; 250/559.13, 559.14, 237 R; 600/427; 701/1, 2, 28, 25, 50, 300; 370/310

(56) References Cited

U.S. PATENT DOCUMENTS

| | | | |
|---|---|---|---|
| 4,134,007 | * 1/1979 | Koreicho et al. | 250/237 R |
| 4,419,012 | * 12/1983 | Stephenson et al. | 356/141.5 |
| 4,475,814 | * 10/1984 | Marche | 356/138 |
| 4,866,626 | * 9/1989 | Egli | 701/1 |
| 4,882,694 | * 11/1989 | Brubaker et al. | 701/28 |
| 4,896,962 | * 1/1990 | Menn et al. | 356/139.03 |
| 5,257,209 | * 10/1993 | Markandey | 701/1 |
| 5,440,392 | * 8/1995 | Pettersen et al. | 356/375 |
| 5,552,883 | 9/1996 | Busch-Vishniac et al. | 356/139.03 |
| 5,774,459 | * 6/1998 | Charrat | 370/310 |
| 5,828,770 | 10/1998 | Leis et al. | 382/103 |
| 5,856,844 | 1/1999 | Batterman et al. | 348/207 |
| 5,877,801 | 3/1999 | Martin et al. | 348/36 |
| 5,884,239 | 3/1999 | Romanik, Jr. | 702/150 |
| 5,886,775 | 3/1999 | Houser et al. | 356/4.01 |
| 5,974,348 | * 10/1999 | Rocks | 701/28 |
| 5,987,349 | * 11/1999 | Schulz | 600/427 |

* cited by examiner

Primary Examiner—Frank G. Font
Assistant Examiner—Sang H. Nguyen
(74) Attorney, Agent, or Firm—Baker Botts L.L.P.

(57) ABSTRACT

A noncontact position and orientation measurement system includes at least four beacons disposed on a first object. Each beacon is operable to generate an optical signal. The system also includes a beacon controller operable to sequentially activate and deactivate each of the beacons. The system also includes an electro-optical sensor disposed on a second object. The electro-optical sensor is operable to generate an output signal for each optical signal received from the beacons. The system further includes a signal con-roller coupled to the electro-optical sensor. The signal controller is operable to determine a position and an orientation of the second object relative to the first object using the output signals generated by the electro-optical sensor.

45 Claims, 13 Drawing Sheets

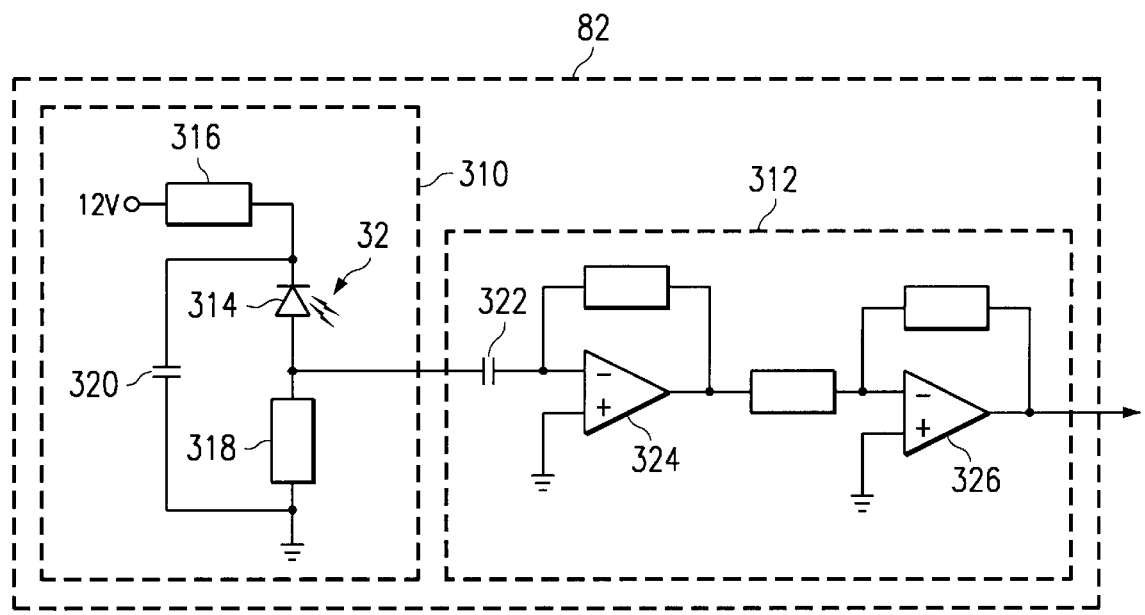
FIG. 12
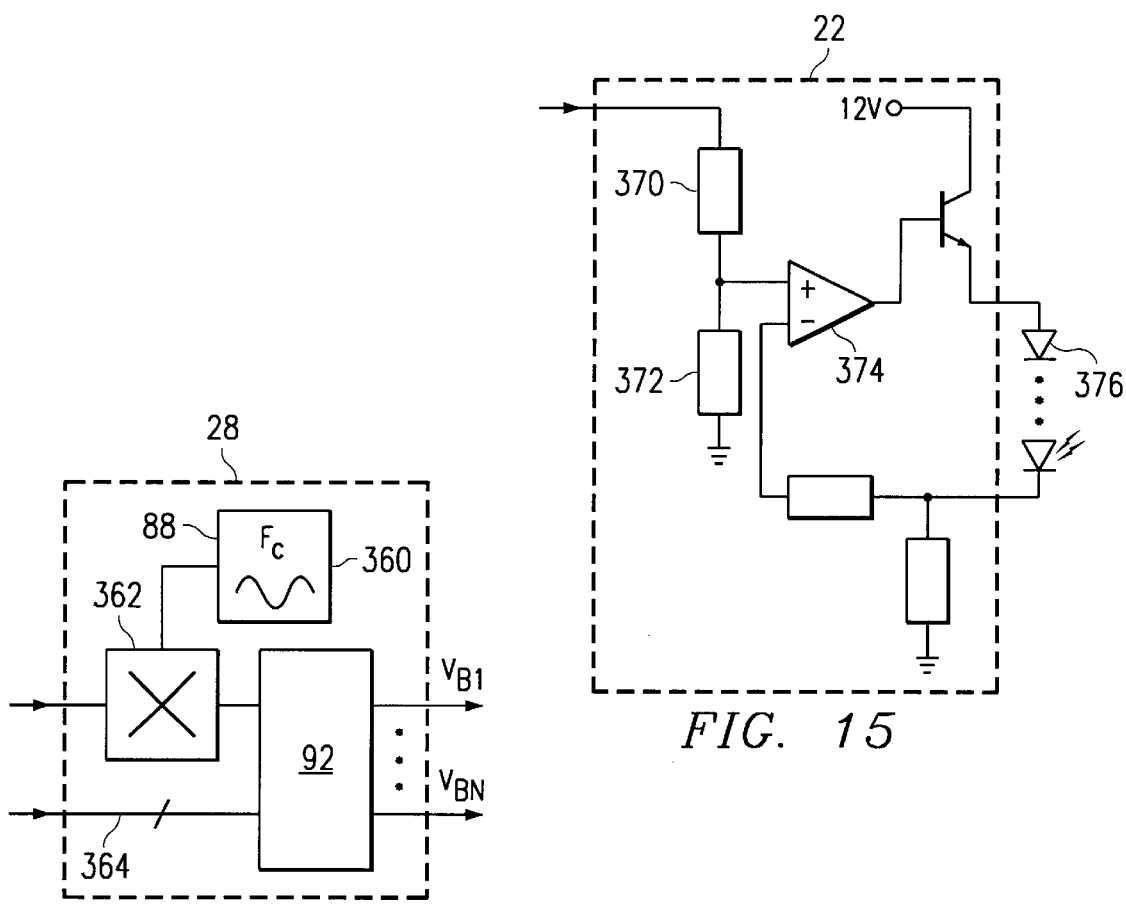
FIG. 14
FIG. 15

NONCONTACT POSITION AND ORIENTATION MEASUREMENT SYSTEM AND METHOD

RELATED APPLICATIONS

This application claims the benefit of Ser. No. 60/101,386, entitled "Laser Position Sensor," filed provisionally on Sep. 21, 1998.

TECHNICAL FIELD OF THE INVENTION

This invention relates in general to the field of position and orientation measurement and, more particularly, to a noncontact position and orientation measurement system and method.

BACKGROUND OF THE INVENTION

Positioning of mechanical systems, robots, aircraft, and spacecraft may be accomplished by a variety of means, including mechanical or optical encoders, video cameras, radar, ultrasonic, and laser ranging systems. To measure the position and orientation of a rigid object, or a sensor attached to the rigid object, a direction to four or more optical targets fixed to a reference object must generally be measured. Sensors such as charge coupled devices, video camera or position sensing detectors may be used to detect the optical targets.

Position sensing detectors are analog devices that centroid incoming light energy sources to determine the direction and position of the optical targets. One example of a position measurement system utilizing position sensing detectors includes placing three or more reflective targets on a target object whose position and orientation is to be measured. Light beams are directed toward the optical targets and produce reflected beams. Each reflected beam is received by a position sensing detector, such as a lateral-effect photodiode. The signals generated by the position sensing detectors are used to determine measurements of translation along and rotation about three non-parallel axes which define the space in which the target object moves.

Prior position measurement systems and methods suffer several disadvantages. For example, the applications of the position measurement systems are generally restricted due to the necessity that retro-reflectors be positioned on an object which is essentially non-reflective. Additionally, any other objects in the measurement system environment must also be essentially non-reflecting.

Additionally, charge coupled devices and video cameras generally require post-processing of a relatively large quantity of digitized image data, in the form of digitized pixel response, to recognize and numerically centroid the optical target images. This process is generally computationally expensive and difficult in the presence of geometrical and environmental variations.

SUMMARY OF THE INVENTION

Accordingly, a need has arisen for an improved technique having greater flexibility and applications for position measurement than prior systems. In accordance with the present invention, a noncontact position and orientation measurement system and method is provided that substantially eliminates or reduces disadvantages and problems associated with previously developed systems and methods.

According to one embodiment of the present invention, a noncontact position and orientation measurement system includes at least four beacons disposed on a first object. Each beacon is operable to generate an optical signal. The system also includes a beacon controller operable to sequentially activate and deactivate each of the beacons. The system also includes an electro-optical sensor disposed on a second object. The electro-optical sensor is operable to generate an output signal for each optical signal received from the beacons. The system further includes a signal controller coupled to the electro-optical sensor. The signal controller is operable to determine a position and an orientation of the second object relative to the first object using the output signals generated by the electro-optical sensor.

According to another embodiment of the present invention, a method for noncontact position and orientation measurement includes sequentially activating and deactivating each of at least four beacons disposed on a first object. Each beacon is operable to generate an optical signal. The method also includes receiving the optical signals generated by each of the beacons at an electro-optical sensor disposed on a second object. The method also includes generating an output signal corresponding to each optical signal received from each beacon using the electro-optical sensor. The method further includes determining a position and an orientation of the second object relative to the first object using the output signals generated by the electro-optical sensor.

The technical advantages of the present invention include a system for noncontact position and orientation measurement that provides increased flexibility of applications. For example, according to one aspect of the present invention, a single electro-optical sensor is used to measure the position of four beacons disposed on an object to determine the position and orientation of the object relative to the electro-optical sensor. The beacons are sequentially activated and deactivated such that an output signal is generated by the electro-optical sensor for each optical signal received from a beacon. Thus, restrictions associated with retro-reflector location and attachment and other reflective objects in the measurement system environment are substantially eliminated.

Another technical advantage of the present invention includes a system for noncontact position and orientation measurement that provides increased efficiency. For example, position sensing detectors are analog devices and generally require less post-processing of image data. Additionally, according to one aspect of the present invention, a single beacon is activated at any given time, thereby resulting in less energy consumption and supply requirements.

Another technical advantage of the present invention includes a system for noncontact position measurement and orientation that automatically compensates for distance and environmental variations. For example, according to one aspect of the present invention, the amplitude and frequency of the optical signals generated by the beacons may be automatically modulated to compensate for distance and environmental variations based on prior optical signals received from the beacons.

Other technical advantages of the present invention will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which:

FIG. 12 is a circuit diagram illustrating a receiver of the system in accordance with an embodiment of the present invention;

FIG. 14 is a block diagram illustrating signal processing in accordance with an embodiment of the present invention;

FIG. 15 is a circuit diagram illustrating a beacon of the system in accordance with an embodiment of the present invention;

DETAILED DESCRIPTION OF THE INVENTION

Among other things, the present invention sequentially activates and deactivates beacons disposed on a first object to generate optical signals. The optical signals are received by an electro-optical sensor disposed on a second object and used to determine the position and orientation of the second object relative to the first object. The optical signals generated by the beacons may be automatically modulated to compensate for distance and environmental variations. The system enables six degree-of-freedom position and orientation measurement for use in a variety of motion-related applications.

Embodiments of the present invention and the advantages thereof are best understood by referring to the following description and drawings, wherein like numerals are used for like and corresponding parts of the various drawings.

Figure 1:
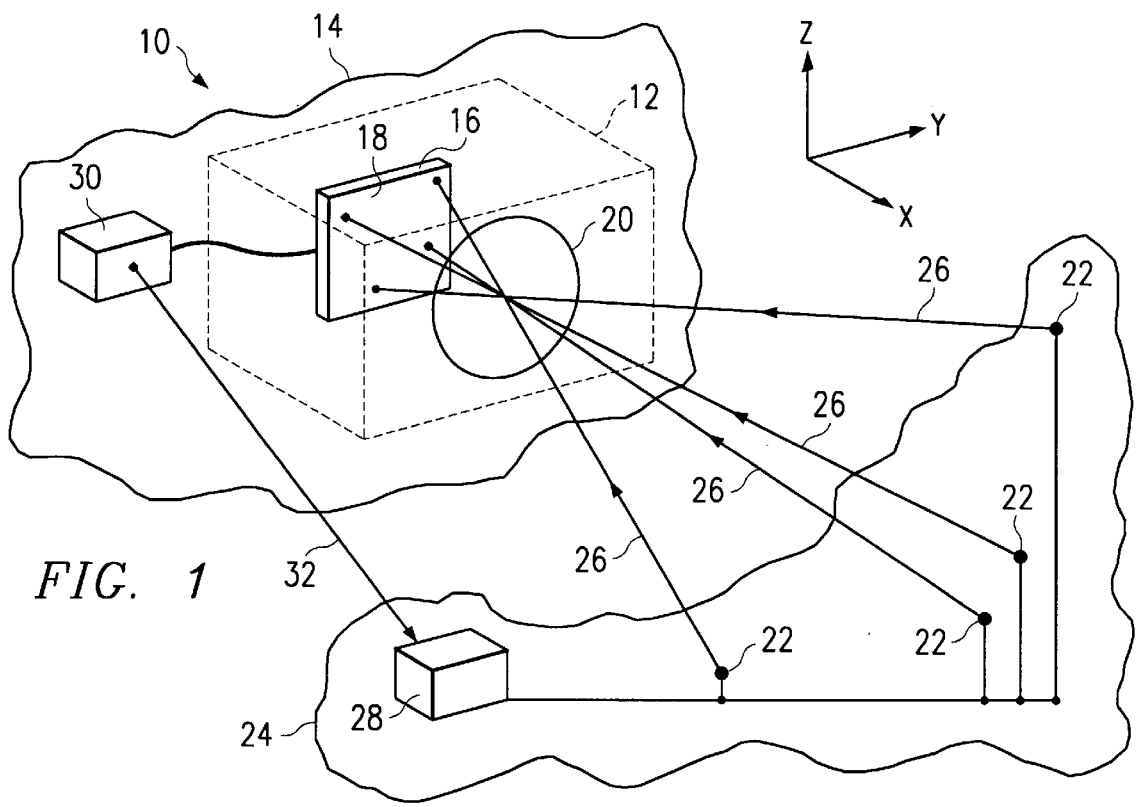
FIG. 1 is a diagram illustrating a noncontact position and orientation measurement system in accordance with an embodiment of the present invention.

FIG. 1 is a diagram illustrating a noncontact position and orientation measurement system 10 in accordance with an embodiment of the present invention. System 10 comprises an electro-optical sensor 12 disposed on an object 14. Object 14 may comprise a stationary object or non-stationary object, such as an aircraft, human body or robotic mechanism. Electro-optical sensor 12 comprises a position sensing detector 16 to centroid incident light received from an energy source from which a line of sight vector toward the energy source may be accurately determined. Position sensing detector 16 may comprise an analog duo-lateral effect photodetector or silicon photodiode; however, other suitable detector devices to centroid incident light may be used.

Briefly, a lead or connection may be coupled to each side of position sensing detector 16. When photons meet an active area 18 of position sensing detector 16, position sensing detector 16 generates output signals or electrical currents that flow through the connections. The closer the incident light centroid is to a particular connection, the larger the portion of current that flows through that connection. Comparison of the four currents flowing through the four connections is then used to determine the centroid location of the incident light.

Electro-optical sensor 12 may also comprise a lens 20 to collect and focus the incident light energy onto position sensing detector 16. For example, lens 20 may comprise a wide angle lens to increase a field of view relative to electro-optical sensor 12. Lens 20 may also comprise a fresnel lens. However, lens 20 may comprise other suitable types of lenses to collect and focus incident light energy onto position sensing detector 16 of electro-optical sensor 12.

System 10 also comprises beacons 22 disposed on an object 24. Object 24 may comprise a stationary or non-stationary object, such as an aircraft, ship deck, human body, or robotic mechanism. Beacons 22 generate light energy or optical signals 26 that may be received by electro-optical sensor 12. In the embodiment illustrated in FIG. 1, four beacons 22 are disposed on object 24; however, greater or fewer beacons 22 may be disposed on object 24 to accommodate various measurement applications. For example, the position of four points on an object is generally required to determine rotational and translational movement of the object 14 in three dimensions relative to object 24. However, fewer beacons 22 may be used for determining only translational movement of object 14 relative to object 24. Thus, the quantity of beacons 22 may be varied to accommodate a variety of position measurement applications.

System 10 also comprises a beacon controller 28 coupled to each beacon 22. Beacon controller 28 sequentially activates and deactivates each beacon 22 to generate optical signals 26. For example, each beacon may be activated for approximately ¹⁄₁₀₀₀ of a second. Beacon controller 28 may be disposed on object 24; however, the present invention also contemplates beacon controller 28 transmitting control signals to receivers disposed on object 24 and coupled to each beacon 22 for controlling the sequential activation and deactivation of beacons 22. Beacon controller 28 may comprise a computer, workstation, mini-computer, mainframe or other computing device with a processor and a volatile or non-volatile memory.

System 10 also comprises a signal controller 30 coupled to electro-optical sensor 12. Signal controller 30 may comprise a computer, workstation, mini-computer, mainframe or other computing device with a processor and volatile or non-volatile memory. Signal controller 30 receives output signals generated by position sensing detector 16 corresponding to optical signals 26 received from beacons 22. Signal controller 30 uses the output signals generated by position sensing detector 16 to centroid optical signals 26 and determine a line of sight vector toward each beacon 22.

Signal controller 30 also generates a control signal 32 transmitted to beacon controller 28 to control the activation and deactivation of beacons 22, the amplitude and frequency of optical signals 26 generated by beacons 22, and the selection or order of beacon 22 activation and deactivation. The operation of beacon controller 28 in combination with signal controller 30 will be described in greater detail in conjunction with FIG. 5.

Figure 2:
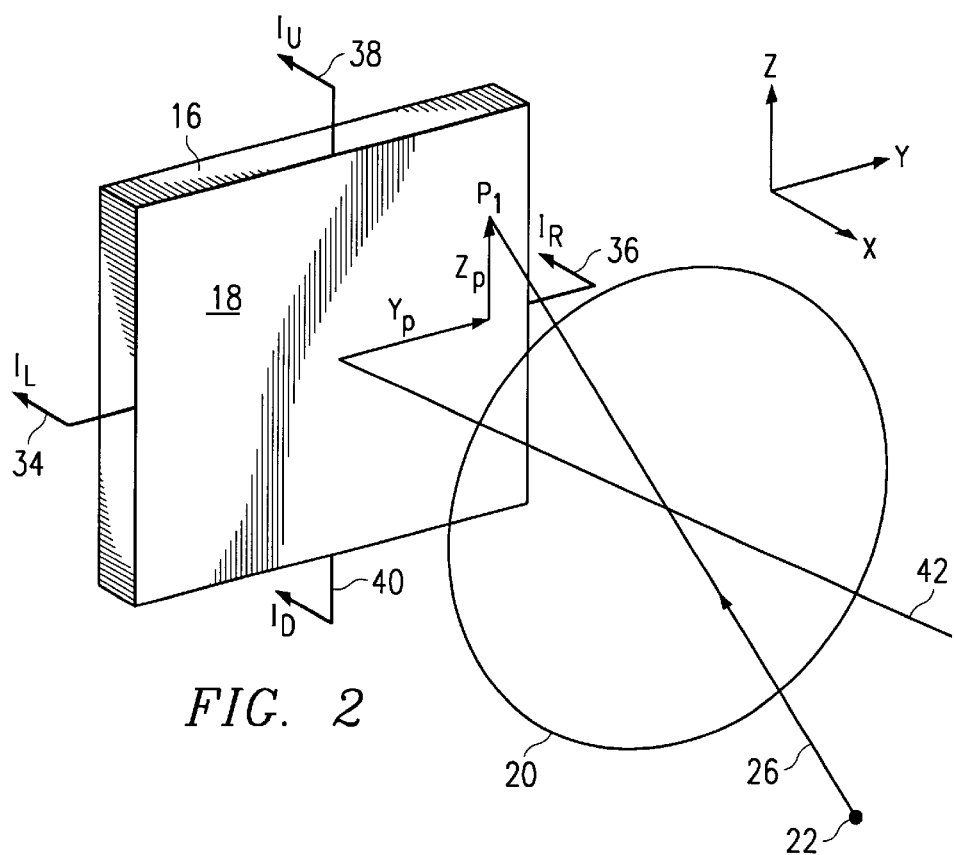
FIG. 2 is a diagram illustrating a coordinate system used to determine a light energy centroid location.

FIG. 2 is a diagram illustrating output signals generated by position sensing detector 16 in response to receiving an optical signal 26 from a beacon 22. Leads or connections 34, 36, 38 and 40 are coupled to each side of position detecting sensor 16. The output signals or currents generated by position detecting sensor 16 in response to receiving optical signal 26 are indicated generally by $I_L$, $I_R$, $I_U$, and $I_D$ corresponding to connections 34, 36, 38 and 40, respectively. As illustrated in FIG. 2, lens 20 is disposed between position sensing detector 16 and beacon 22 along an axis 42 substantially orthogonal to position sensing detector 16. Thus, as beacon 22 is activated within a field of view of active surface 18 of position sensing detector 16, lens 20 focuses optical signal 26 on active area 18 of position sensing detector 16.

In operation, optical signal 26 creates an energy spot on active area 18 of position sensing detector 18 indicated generally by $P_1$. The closer $P_1$ is to one of connections 34, 36, 38 and 40, the stronger the current flow is through that particular connection. For example, the location of $P_1$ is illustrated relative to axis 42 by a distance taken along the Y axis, indicated generally by $Y_P$, and a distance taken along the Z axis, indicated generally by $Z_P$. Thus, in this example, the current flows output by position sensing detector 16 are approximately, from strongest to weakest, would be $I_R$, $I_U$, $I_D$, and $I_L$. By comparing the strength of the four current flows, an accurate estimate of the centroid of optical signal 26 may be determined.

Figure 3:
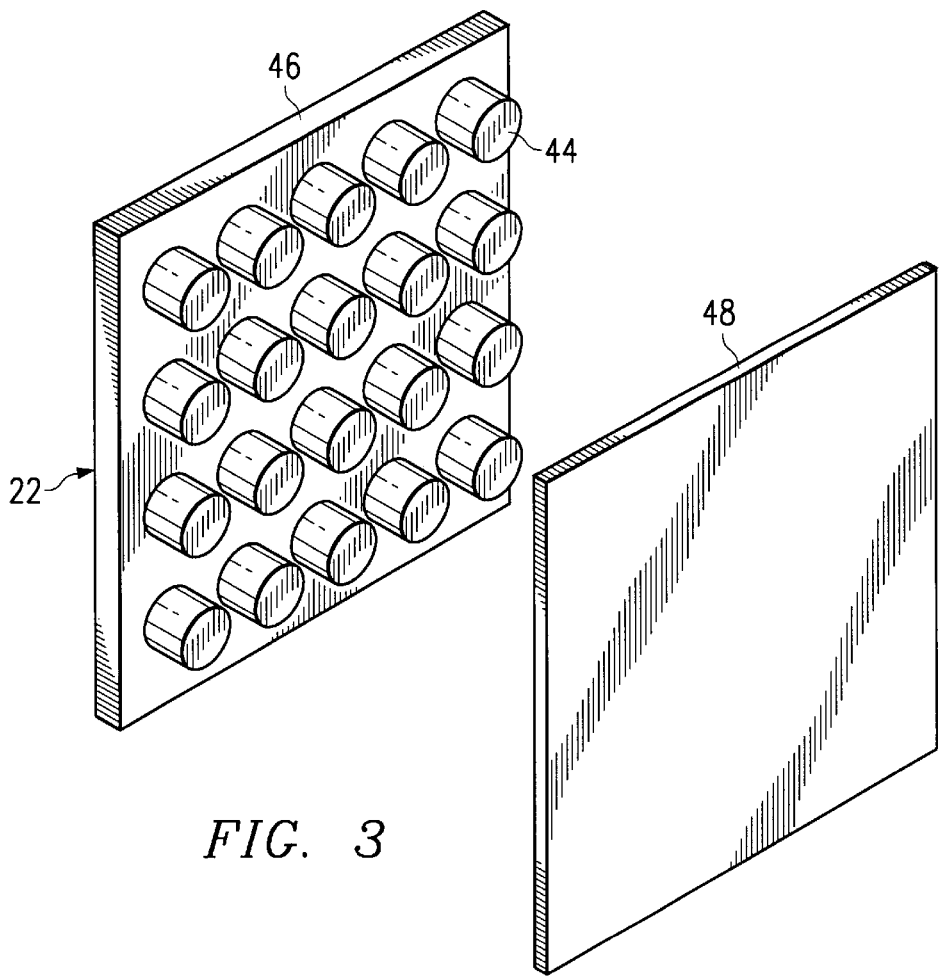
FIG. 3 is a diagram illustrating a beacon of the system in accordance with an embodiment of the present invention.

FIG. 3 is a diagram illustrating beacon 22 in accordance with an embodiment of the present invention. Beacon 22 comprises an array of optical signal generators 44 coupled to a platform 46 to generate optical signals 26. Optical signal generators 46 may comprise light emitting diodes to produce a wide angle radiation pattern; however, other suitable light or energy generating devices may be used for optical signal generators 44. Additionally, greater or fewer optical signal generators 44 may be used for generating optical signals 26 to accommodate a variety of applications. For example, a greater quantity of optical signal generators 44 may be required for long distance measurement applications. Beacon 22 may also comprise a diffuser 48 or other optical element to broaden and smooth optical signals 26 generated by beacon 22.

Figure 4:
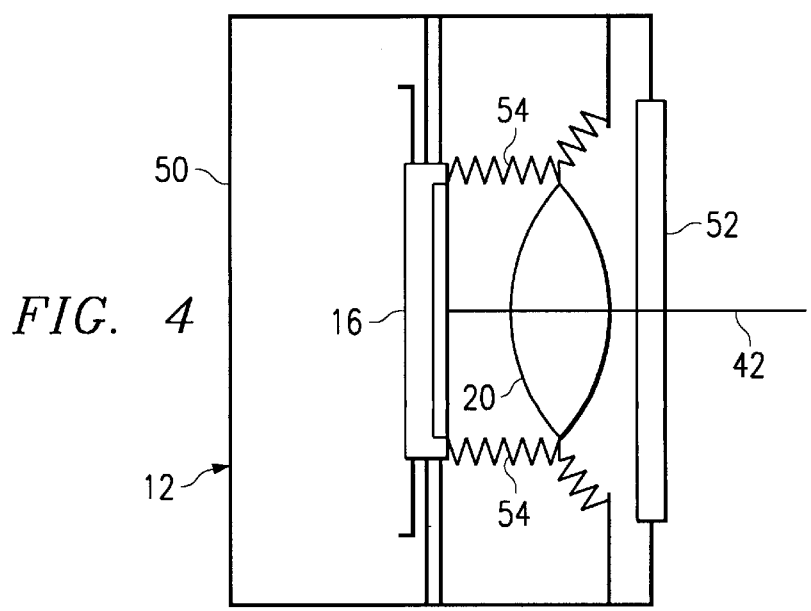
FIG. 4 is a diagram illustrating an electro-optical sensor of the system in accordance with an embodiment of the present invention.

FIG. 4 is a diagram illustrating electro-optical sensor 12 in accordance with an embodiment of the present invention. Electro-optical sensor 12 comprises position sensing detector 16 disposed within a housing 50. Electro-optical sensor 12 may also comprise a filter 52 coupled to housing 50 to shield or prevent ambient light or other optical signals of varying frequencies from reaching position sensing detector 16. Thus, filter 52 may be used to protect position sensing detector 16 from harmful light energy densities and help to reduce noise from ambient or other light sources.

Electro-optical sensor 12 also comprises lens 20 disposed between position sensing detector 16 and filter 52. As described above, lens 20 collects and focuses optical signals 26 onto position sensing detector 16. Lens 20 may be coupled to housing 50 and position sensing detector 16 using low reflectivity supports 54. For example, supports 54 may comprise accordion-configured baffles to absorb and/or attenuate unwanted light energy within electro-optical sensor 12.

Figure 5:
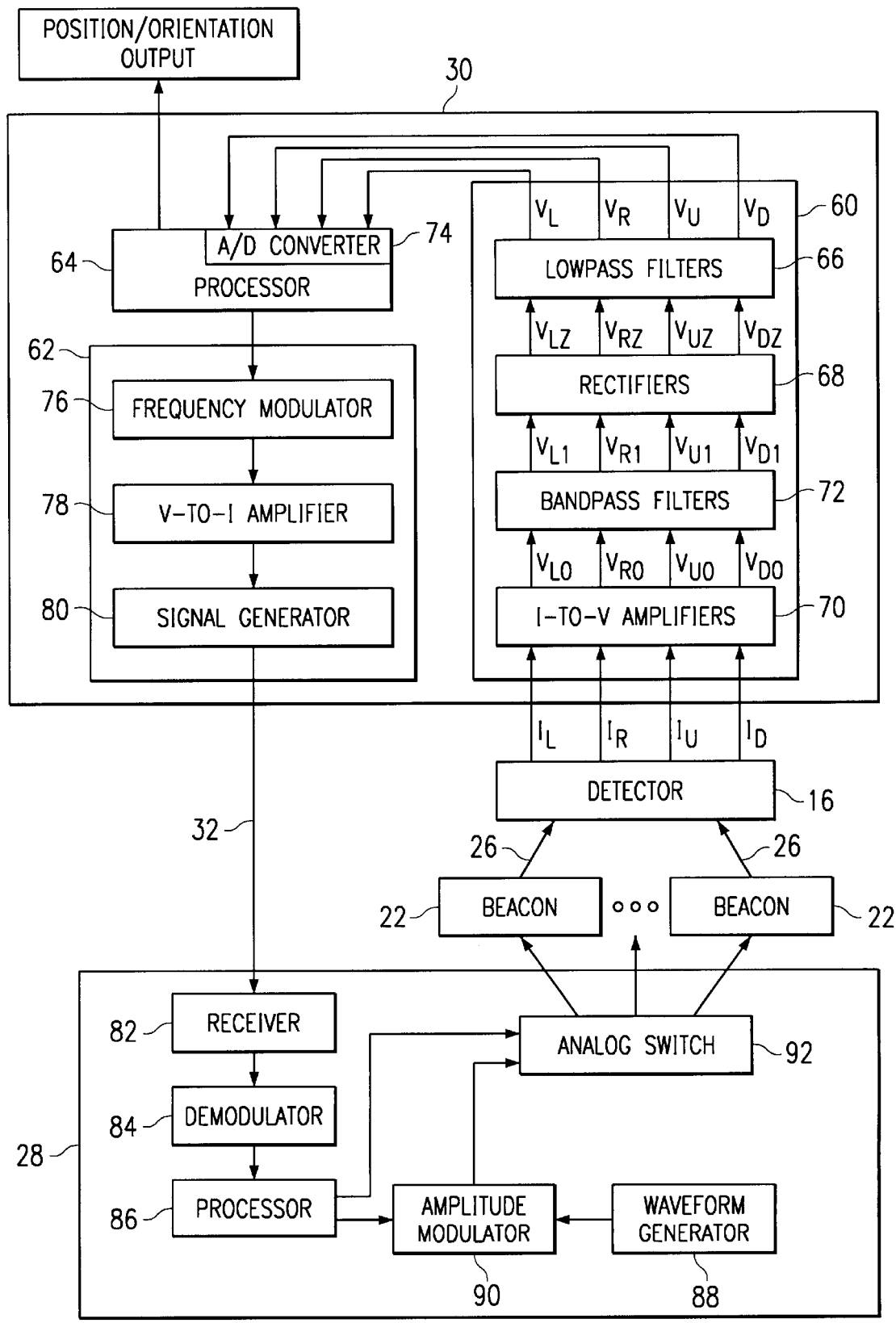
FIG. 5 is a block diagram illustrating the noncontact position and orientation measurement system in accordance with an embodiment of the present invention.

FIG. 5 is a block diagram illustrating system 10 in accordance with an embodiment of the present invention. Signal controller 30 comprises an analog signal processing system 60, a beacon control signal processing system 62, and a digital signal processor 64. Analog signal processing system 60 receives output current signals $I_L$, $I_R$, $I_U$, and $I_D$ generated by position sensing detector 16 in response to receiving an optical signal 26 from a beacon 22. Analog signal processing system 60 comprises a lowpass filter 66, rectifiers 68, current-to-voltage amplifiers 70 and a bandpass filter 72.

Amplifiers 70 receive output current signals $I_L$, $I_R$, $I_U$, and $I_D$ from position sensing detector 16, amplifies the output current signals $I_L$, $I_R$, $I_U$, and $I_D$, and converts the output current signals $I_L$, $I_R$, $I_U$, and $I_D$ to electrical voltages $V_{L0}$, $V_{R0}$, $V_{U0}$, and $V_{D0}$, respectively. Bandpass filter 72 receives voltages $V_{L0}$, $V_{R0}$, $V_{U0}$, and $V_{D0}$, removes unwanted frequency noise and disturbance signals, and outputs bipolar voltages $V_{L1}$, $V_{R1}$, $V_{U1}$, and $V_{D1}$, respectively. Rectifiers 68 receive bipolar voltages $V_{L1}$, $V_{R1}$, $V_{U1}$, and $V_{D1}$ and convert bipolar voltages $V_{L1}$, $V_{R1}$, $V_{U1}$, and $V_{D1}$ to unipolar voltages $V_{L2}$, $V_{R2}$, $V_{U2}$, and $V_{D2}$, respectively. Lowpass filter 66 smoothes voltages $V_{L2}$, $V_{R2}$, $V_{U2}$, and $V_{D2}$ to produce voltages $V_{L2}$, $V_{R2}$, $V_{U2}$, and $V_{D2}$. Voltages $V_L$, $V_R$, $V_U$, and $V_D$ may then be compared to each other to derive an accurate estimate of the location of the centroid on position sensing detector 16 of an optical signal 26, thereby providing a directional vector corresponding to a beacon 22. The circuitry of amplifier 70, bandpass filter 72, rectifier 68 and lowpass filter 66 is described in greater detail in conjunction with FIGS. 6–8.

Voltages $V_L$, $V_R$, $V_U$, and $V_D$ are received by an analog-to-digital converter 74 operable to run on digital signal processor 64. A suitable digital signal processor is manufactured by Texas Instruments under part number TMS320C31 running at 60 MHz and having a floating point operations per second rating of sixty million. Digital signal processor 64 may also comprise a serial RS-232 circuit that outputs the computed position and orientation measurements to any connected device.

A numerical algorithm executable by digital signal processor 64 is used to perform the comparison of voltages $V_L$, $V_R$, $V_U$, and $V_D$ to determine the centroids on position sensing detector 16 of optical signals 26 received from beacons 22. The algorithm is further described in conjunction with FIG. 10. The algorithm is also used to determine which beacon 22 shall be activated next and adaptively regulates an amplitude and frequency of the next optical signal 26 generated. This information is then transmitted to beacon controller 28. However, alternative embodiments for determining the centriods on position sensing detector 16 may include the complete or partial use of analog circuitry when comparing voltages $V_L$, $V_R$, $V_U$, and $V_D$.

Beacon control processing system 62 comprises a frequency modulator 76, a voltage-to-current amplifier 78, and a control signal generator 80. In operation, frequency modulator 76 receives the information regarding the next beacon 22 to be activated from digital signal processor 64 and encodes the information as a frequency shift keyed voltage signal. After encoding, voltage-to-current amplifier 78 amplifies and converts the frequency shift keyed voltage signal to a frequency shift keyed current signal. The frequency shift keyed current signal is then transmitted to control signal generator 80 to generate control signal 32 transmitted to beacon controller 28. Control signal generator 80 may comprise light emitting diodes to generate a wide angle radiation light pattern to be received by beacon controller 28. However, control signal generator 80 may also comprise other suitable signal generating devices for transmitting control information to beacon controller 28. Additionally, other suitable modulation techniques may be used in conjunction with beacon control processing system 62 in order to provide a reliable data link between signal controller 30 and beacon controller 28, including, but not limited to, phase and amplitude modulation.

Beacon controller 28 comprises a signal receiver 82, a demodulator 84, and a processor 86. Signal receiver 82 is operable to receive control signals 32 generated by control signal generator 80. For example, receiver 82 may comprise a photodiode to detect control signals 32; however, receiver 82 may comprise other suitable signal receiving devices corresponding to the types of control signals 32 generated by control signal generator 80. Demodulator 84 demodulates control signal 32 and transmits digital information to processor 86 regarding the next beacon 22 to be activated.

Beacon controller 28 also comprises a waveform generator 88, an amplitude modulator 90, and an analog switch 92. Waveform generator 88 generates a time varying voltage waveform for optical signals 26 generated by beacons 22. Amplitude modulator 90 determines and sets a peak voltage level of the time varying voltage waveform generated by waveform generator 88. The time varying voltage waveform is then transmitted to analog switch 92 which is controlled by processor 86 for the activation and deactivation of beacons 22. Thus, optical signals 26 generated by beacons 22 may be separated from background or ambient light using analog signal processing system 60.

For example, in operation, unwanted background light from extraneous sources such as the sun, computer monitors or light fixtures would also be focused on position sensing detector 16, thereby generating electrical currents associated with these extraneous light sources. However, the light strength of beacon 22 required to sufficiently dominate the extraneous electrical currents may be undesirably large and constitute a safety hazard. Thus, optical signals 26 generated by beacons 22 are varied at a unique waveform, and at sufficiently high frequencies, to distinguish optical signals 26 from lower frequency variations of extraneous light sources. For example, a simple square wave on/off modulation at 40,000 switches per second at an interval of 0.001 second may be used. During intervals where all of beacons 22 are not activated, the frequency of extraneous light source currents generated by position sensing detector 16 may be monitored to ensure appropriate modulation frequency selection.

Additionally, the amount of optical signal 26 received from beacon 22 by position sensing detector 16 depends upon many factors, including, but not limited to, the radiation pattern of a particular beacon 22, the position and orientation of position sensing detector 16 relative to a beacon 22, and the conditions of the intervening medium such as water content and form. Since some of these factors may vary widely in operation, the strength of optical signals 26 for particular applications may saturate amplifier 70, especially if the light path length between a beacon 22 and position sensing detector 16 is relatively small. At other times, the strength of optical signals 26 generated by beacons 22 may be too weak, resulting in an unsatisfactorily small output current to noise ratio of position sensing detector 16.

However, a distance squared relationship exists between the transmitting and received energy. Thus, for example, a tenfold change in the distance between a beacon 22 and position sensing detector 16 requires on the order of a hundred fold change in the emitted energy of beacon 22 to maintain optimal signal to noise ratio of the measurements of position sensing detector 16. In accordance with the present invention, the system 10 adapts to the varying distance and environmental conditions by controlling the amplitude of the time varying optical signal 26 generated by each beacon 22. Thus, system 10 adapts to maintain the maximum of the output current signals generated by position sensing detector 16 at some fixed percentage less than 100% of the saturation level of amplifier 70. This ideal output current signal level may be identified as $I_x$ and may be determined to optimize the signal to noise ratio of position sensing detecting 16.

For example, the algorithm executable by processor 64 determines which beacon 22 is to be activated next and transmits this information to beacon controller 28 via control signal 32. The algorithm also adaptively specifies the maximum intensity of optical signals 26 generated by beacons 22 to obtain the maximum output current signals generated by position sensing detector 16 to be substantially equal to $I_x$. This amplitude information is also transmitted as part of control signal 32 to beacon controller 28. Thus, if the maximum output current signal generated by position sensing detector 16 induced by a particular beacon 22 is greater than or Less than $I_x$, then the next time that beacon 22 is activated, the control signal 32 will command that a stronger or weaker, respectively, optical signal 26 be generated by that beacon 22. Processor 86 receives control signal 32 and sets amplitude modulator 84 accordingly to generate the stronger or weaker optical signal 26 the next time that beacon 22 is activated.

Figure 6:
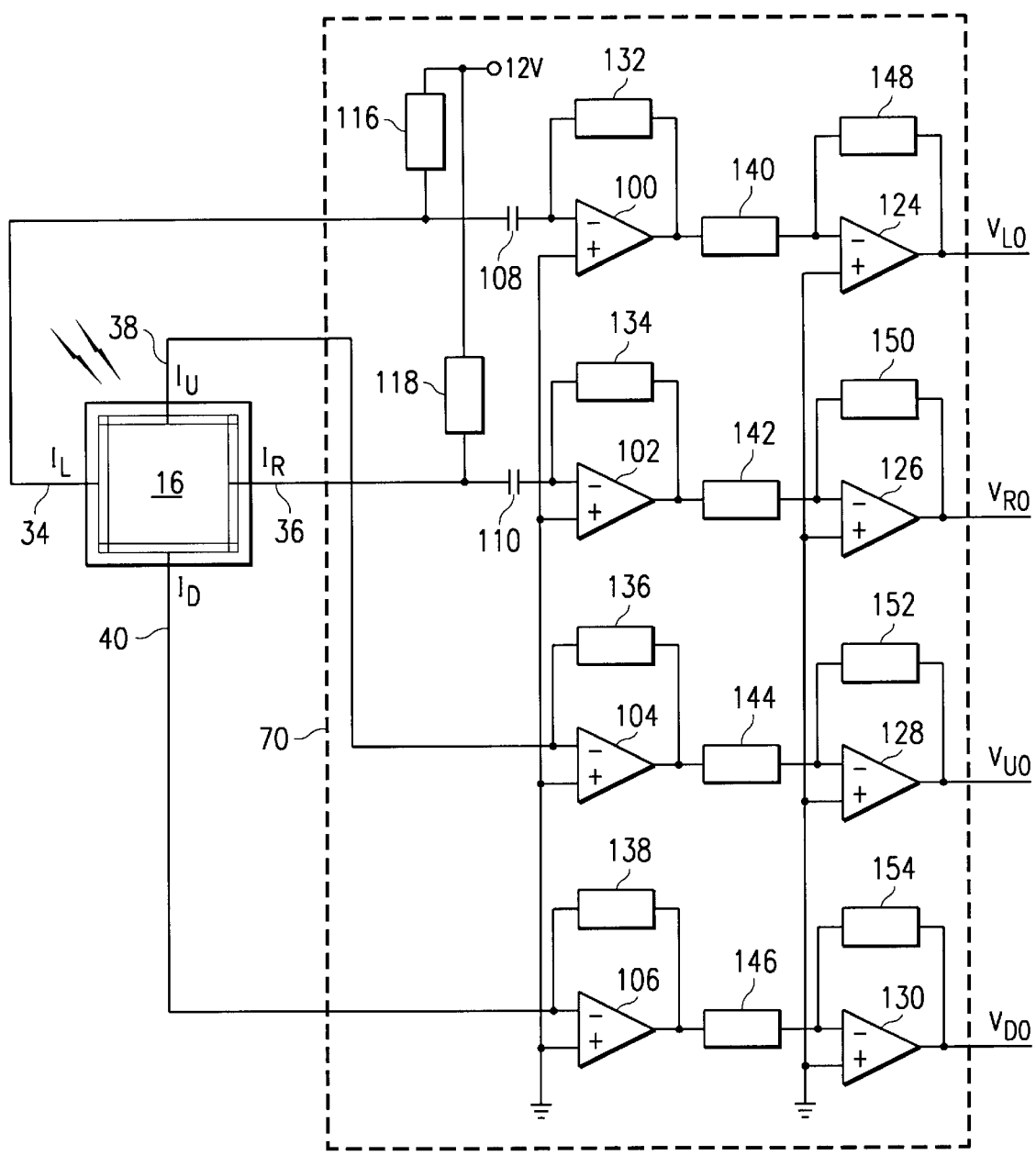
FIG. 6 is a circuit diagram illustrating an amplifier of the system in accordance with an embodiment of the present invention.

FIG. 6 is a circuit diagram illustrating current-to-voltage amplifier 70 in accordance with an embodiment of the present invention. Generally, position sensing detector 16 is electrically reverse biased to provide a sufficiently large bandwidth for position sensing detector 16 to respond to high frequency optical waveforms. As described above, four time varying electrical currents $I_L$, $I_R$, $I_U$, and $I_D$ are generated by position sensing detector 16 that are characteristic of the location of the incident light in the active area 18 of position sensing detector 16. However, the levels of currents $I_L$, $I_R$, $I_U$, and $I_D$ are relatively small and must be amplified for further processing. Furthermore, any relatively large low frequency currents generated by ambient or unwanted light sources must not interfere with this amplification.

As illustrated in FIG. 6, connections 34, 36, 38, and 40 coupled to position sensing detector 16 transmit current signals $I_L$, $I_R$, $I_U$, and $I_D$, respectively, generated by position sensing detector 16. Each connection 34, 36, 38 and 40 is coupled to an operational amplifier 100, 102, 104, and 106 either directly or through a capacitor 108 or 110. Capacitors 108 and 110 block the steady state voltage induced by the 12V source. Position sensing detector 16 reverse bias is provided via resistors 116 and 118.

The voltage signals at the outputs of amplifiers 100, 102, 104 and 106 are approximately proportional to the position sensing detector 16 currents $I_L$, $I_R$, $I_U$, and $I_D$ at the signal frequencies of interest. However, the voltage signals at this stage are still relatively small and a second set of operational amplifiers 124, 126, 128 and 130 are used to complete the current-to-voltage amplification, thereby providing output of voltage signals $V_{L0}$, $V_{R0}$, $V_{U0}$, and $V_{D0}$. The circuitry of amplifier 70 also comprises resistors 132, 134, 136, 138, 140, 142, 144, 146, 148, 150, 152 and 154 connected as illustrated in FIG. 6.

Figure 7:
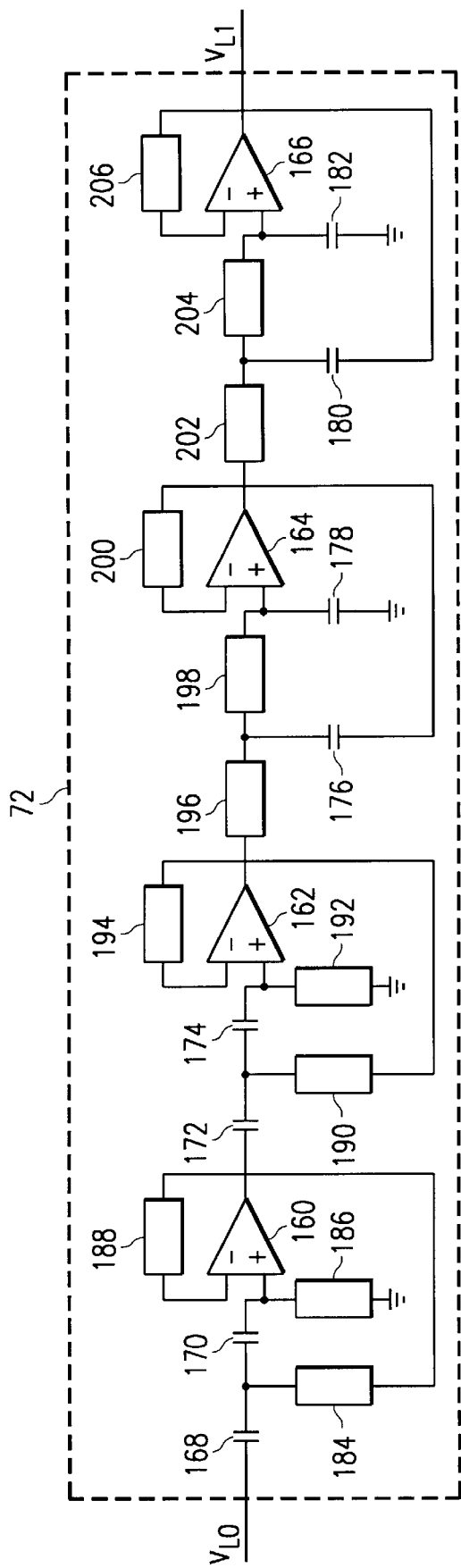
FIG. 7 is a circuit diagram illustrating a bandpass filter of the system in accordance with an embodiment of the present invention.

FIG. 7 is a circuit diagram illustrating bandpass filters 72 in accordance with an embodiment of the present invention. At this stage, unwanted noise and disturbance signals may still remain at frequencies above and below that of optical signals 26 generated by beacons 22. These unwanted noise and disturbance signals are largely attenuated by bandpass filters 72. For ease of illustration, only the circuitry for bandpass filters 72 operating on the voltage signal $V_{L0}$ and outputting voltage signal $V_{L1}$ is illustrated. It should be understood that voltage signals $V_{R0}$, $V_{U0}$, and $V_{D0}$ are processed by bandpass filters 72 in a similar manner to provide output voltage signals $V_{R1}$, $V_{U1}$, and $V_{D1}$.

As illustrated in FIG. 7, an eight order Bessel filter providing fourth order roll-off at high and low frequencies is provided. Bandpass filter 72 comprises four voltage controlled voltage source (VCVS) stages, two high pass stages followed by two low pass stages. Bandpass filter 72 comprises an operational amplifier 160, 162, 164 and 166 for each VCVS stage, and the center frequency is that of the waveform carrier of optical signal 26. Bandpass filter also comprises capacitors 168, 170, 172, 174, 176, 178, 180 and 182 and resistors 184, 186, 188, 190, 192, 194, 196, 198, 200, 202, 204 and 206 connected as illustrated in FIG. 7.

Figure 8:
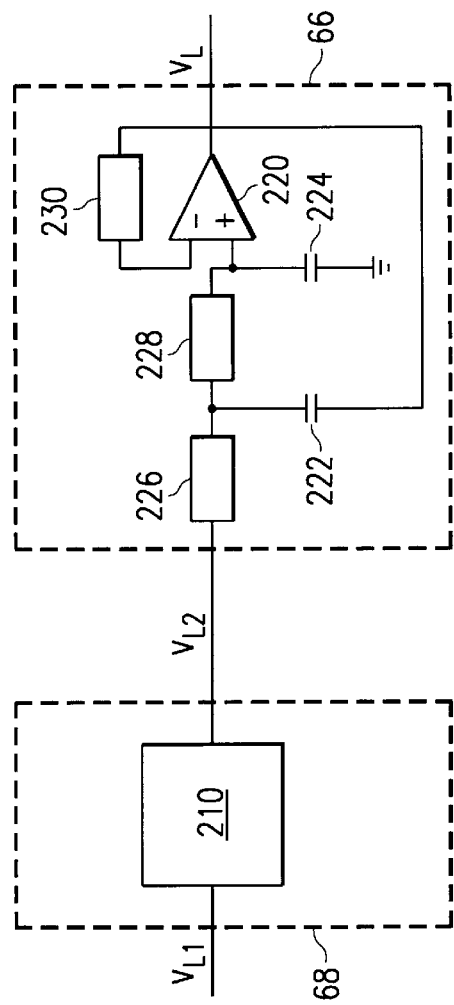
FIG. 8 is a circuit diagram illustrating a rectifier and a lowpass filter of the system in accordance with an embodiment of the present invention.

FIG. 8 is a circuit diagram illustrating rectifier 68 and lowpass filter 66 in accordance with an embodiment of the present invention. At this stage, substantially all of the unwanted noise and disturbance signals have been removed and the signal characteristics of interest are the relative magnitudes of the four voltage signal $V_{L1}$, $V_{R1}$, $V_{U1}$, and $V_{D1}$ envelopes. For ease of illustration, only the circuitry for rectifier 68 operating on the voltage signal $V_{L1}$ to output voltage signal $V_{L2}$, and lowpass filter 66 operating on voltage signal $V_{L2}$ to output voltage signal $V_L$, is illustrated. It should be understood that voltage signals $V_{R1}$, $V_{U1}$, and $V_{D1}$ are processed by rectifier 68 and lowpass filter 66 in a similar manner to provide output voltage signals $V_R$, $V_U$, and $V_D$.

To measure the voltage signal $V_{L1}$ envelope amplitude, the voltage signal $V_{L1}$ is rectified with a high precision rectifier 210. The bipolar voltage signal $V_{L1}$ envelope is converted to a unipolar voltage signal envelope $V_{L2}$. Lowpass filter 66 then operates on unipolar voltage signal $V_{L2}$ to pass the wanted low frequency envelope magnitudes while blocking the remaining high frequency effects of the waveform of optical signal 26. In the embodiment illustrated in FIG. 8, lowpass filter 66 comprises a second order Butterworth filter comprising an operational amplifier 220, capacitors 222 and 224, and resistors 226, 228 and 230 connected as illustrated in FIG. 8.

FIG. 9 is a flow diagram illustrating a method for non-contact position and orientation measurement in accordance with an embodiment of the present invention. The method comprises the steps illustrated in FIG. 9 in the order illustrated in FIG. 9.

Figure 10:
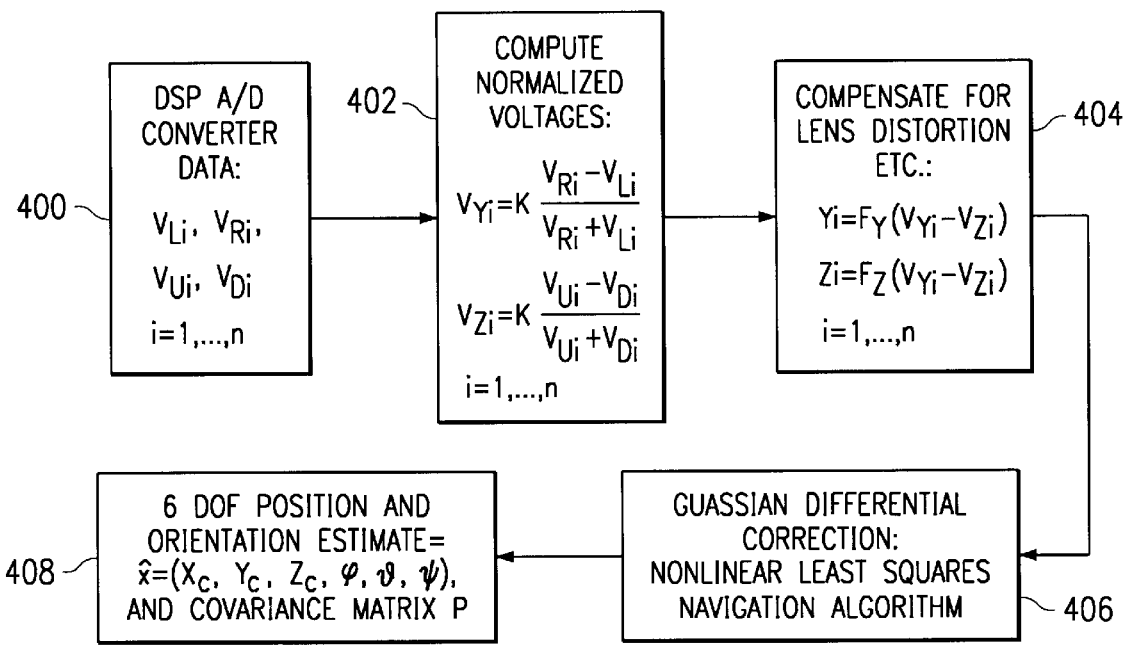
FIG. 10 is a flow diagram illustrating an algorithm of the system in accordance with an embodiment of the present invention.

FIG. 10 is a diagram illustrating the algorithm executable by processor 64 to determine the centroid on position sensing detector 16 of optical signals 26 generated by beacons 22, to compensate for distortion introduced by a non-ideal lens 20, position sensing detector 16, or other system 10 component, and then to compute the six degree-of-freedom position and orientation estimate. Generally, the algorithm estimates the centroid of optical signals 26, indicated generally by $(Y_{Pi}, Z_{Pi})$ for a specified set of beacons ($i_1$, $i_2$, $i_3$, $i_4$, . . . ) and computes an estimate of the six degree-of-freedom position and orientation of position sensing detector 16 using a Gaussian Least Squares Differential Correction algorithm.

At step 400, processor 64 and analog-to-digital converter receive voltage signals $V_{Li}$, $V_{Ri}$, $V_{Ui}$, and $V_{Di}$ from analog signal processing system 60, where "i=1, . . . ,n" represents the first through the nth number of beacons 22. At step 402, normalized voltage signals $V_{Yi}$ and $V_{Zi}$ are determined using voltage signals $V_{Li}$, $V_{Ri}$, $V_{Ui}$, and $V_{Di}$ by comparing voltage signals $V_{Li}$, $V_{Ri}$, $V_{Ui}$, and $V_{Di}$ to each other using the following equation:

$$V_y = K\left(\frac{V_R - V_L}{V_R + V_L}\right) \quad V_z = K\left(\frac{V_U - V_D}{V_U + V_D}\right) \tag{1}$$

in order to derive an accurate estimate of the location of the light centroid on position sensing detector 16 of an optical signal 26 and, thus, the direction of the corresponding beacon 22 relative to axis 42 of position sensing detector 16. The voltage signals $V_y$ and $V_z$ may be mapped into calibrated image coordinates using calibration functions as described below. Additionally, at step 404, compensation for lens 20 and other distortion using the equations illustrated in FIG. 10 and as further described below.

At step 406, a Gaussian Differential Correction and non-linear Least Squares Navigation algorithm is applied, and at step 408, the six degree-of-freedom position and orientation measurements of position sensing detector 16 and object 14 are determined relative to object 24, as further described below. As illustrated in FIGS. 1 and 2, coordinate system x,y,z represents the coordinate system of object 14 and position sensing detector 16, and coordinate system X,Y,Z represents the coordinate system of object 24. The ideal object-to-image space projective transformation (noiseless) may be illustrated by the following equations:

$$y_i = g_{yi}(X_i, Y_i, Z_i, X_c, Y_c, Z_c, \phi, \theta, \psi) \tag{2}$$
$$= y_o - f\frac{C_{21}(X_i - X_c) + C_{22}(Y_i - Y_c) + C_{23}(Z_i - Z_c)}{C_{11}(X_i - X_c) + C_{12}(Y_i - Y_c) + C_{13}(Z_i - Z_c)}$$

$$z_i = g_{zi}(X_i, Y_i, Z_i, X_c, Y_c, Z_c, \phi, \theta, \psi) \tag{3}$$
$$= z_o - f\frac{C_{31}(X_i - X_c) + C_{32}(Y_i - Y_c) + C_{33}(Z_i - Z_c)}{C_{11}(X_i - X_c) + C_{12}(Y_i - Y_c) + C_{13}(Z_i - Z_c)}$$

$$i = 1, 2, \ldots N \tag{4}$$

These ideal projection equations correspond to a pin hole camera model. As described above and further described below, the voltage signals $V_y$ and $V_z$ are passed through a nonlinear calibration function to obtain calibrated image centroids (y,z) consistent with these ideal projection equations, noting that the x-axis is along the position sensing detector 16 boresight.

The $C_{jk}$ entries in the above equations are the nine elements of the direction cosine matrix C that describes the image space orientation with respect to the object space, and in this case is in yaw, pitch and roll Euler angle form:

$$C = \begin{bmatrix} c_\theta c_\phi & c_\theta s_\phi & -s_\theta \\ -c_\psi s_\phi + s_\psi s_\theta c_\phi & c_\psi c_\phi + s_\psi s_\theta s_\phi & s_\psi c_\theta \\ s_\psi s_\phi + c_\psi s_\theta c_\phi & -s_\psi c_\phi + c_\psi s_\theta s_\phi & c_\psi c_\theta \end{bmatrix} \quad (5)$$

$$c. \equiv \cos(.), \ s. \equiv \sin(.) \quad (6)$$

$$(\phi, \theta, \psi) \equiv (\theta_1, \theta_2, \theta_3) \equiv (\text{yaw, pitch, roll}) \quad (7)$$

where:

$X_c, Y_c, Z_c$ are the unknown object space location of the position sensing detector 16 located on object 14;

$\phi, \theta, \psi$, are the unknown object space orientation of position sensing detector 16 and object 14 as 3-2-1 Euler angles;

$C_{ij}(\phi, \theta, \psi)$ are coefficients of the direction cosine matrix that rotates the object 24 space body frame into the object 14 frame containing position sensing detector 16;

$X_i, Y_i, Z_i$ are the known object 24 location of the ith beacon 22;

$y_i, z_i$ are the position sensing defector 16 image space measurements for the ith beacon; and f is the known focal length of the wide-angle lens 20.

The position sensing detector 16 location and orientation variables comprise six independent unknowns ($X_c, Y_c, Z_c, \phi, \theta, \psi$) of object 14 relative to object 24, and, therefore, at least six independent position sensing detector 16 derived image coordinate measurements are required, so at least three beacon 22 optical signals 26 are required (one y and one z measurement per beacon 22). There are generally multiple solutions for the three beacon 22 case. Thus, at least one additional beacon 22 is required to establish a unique solution. Since position sensing detector 16 is fixed in object 14 and beacons 22 are fixed in object 24, ($X_c, Y_c, Z_c, \phi, \theta, \psi$) constitutes the six degree-of-freedom position of object 14 relative to object 24.

Equations 2 and 3 are non-linear equations in the six unknowns. A Least Square Differential Correction algorithm may be applied in order to determine ($X_c, Y_c, Z_c, \phi, \theta, \psi$) given the position sensing detector 16 measurements and corresponding object space beacon 22 locations. The algorithm is an iterative technique, but convergence is fast and reliable provided four or more beacons 22 are measured with the lateral extent of the beacon 22 array subtending a sufficient angle relative to the position sensing detector 16.

In order to use the position sensing detector 16, the nonlinear mapping F between the measured normalized voltages ($V_y, V_z$) returned to position sensing detector 16 and the location ($y_i, z_i$) of the light centroid on active area 18 of position sensing detector 16 is generally required. The projection of Equations 2 and 3, known as the colinearity equations, represents the ideal case for a pin-hole camera model. However, in application, the lens 20 and the position sensing detector 16 nonlinearities may depart from this ideal model. The non-ideal effects may be absorbed into a calibration process that is implicitly constrained to be consistent with Equations. 2 and 3 which will be inverted in real-time to obtain the navigation estimates ($\phi, \theta, \psi, X_c, Y_c, Z_c$). The ideal laboratory calibration process places the position sensing detector 16 ($\phi, \theta, \psi, X_i, Y_i, Z_i$) at many known positions relative to an array of beacons 22 located at ($X_j, Y_j, Z_j$) and determines from these measurements the nonlinear mapping of the measured voltage imbalances ($V_y, V_z)_{ij}$ into the corresponding known ideal image coordinates ($y_i, z_i$) consistent with the ideal projection transformation of Equations 2 and 3. Using experimental data, the function $F(V_y, V_z)$ may be approximated satisfactorily using a set of Chebyshe-v polynomial basis functions $\{\Phi_1(V_y, V_z), \ldots, \Phi_N(V_y, V_z)\}$ whose coefficients $\{a_1, \ldots, a_N\}$ and $\{b_1, \ldots, b_N\}$ are found using a standard linear least squares technique. Generally, N<10 is typically sufficient to capture all nonlinearities in practice.

$$y = F_y(V_y, V_z) = \sum_{i=1}^{N} a_i \Phi_i(V_y, V_z) \quad (8)$$

$$z = F_z(V_y, V_z) = \sum_{i=1}^{N} b_i \Phi_i(V_y, V_z) \quad (9)$$

Using Equations 8 and 9, the position sensing detector 16 nonlinearities, lens 20 distortion effects and any other departures from the ideal projection transformation of Equations 2 and 3 are calibrated using these two experimentally derived functions $F_y$ and $F_z$.

As described above and in conjunction with FIG. 5 and 9, if the maximum output current signal generated by position sensing detector 16 induced by a particular beacon 22 is greater than or less than $I_X$, then the next time that beacon 22 is activated, the control signal 32 will command that a stronger or weaker, respectively, optical signal 26 be generated by that beacon 22. In one embodiment, the algorithm may be expressed as:

$$\text{if } L_j(\text{last time}) \text{ exists; } L_j(\text{next time}) = \frac{L_j(\text{last time}) * I_X}{I_j} \quad (10)$$

$$\text{else } L_j(\text{next time}) = L_{MAX} \quad (11)$$

where $I_j$ is the maximum output current signal generated by position sensing detector 16 the last time beacon 22 was activated, represented above as #j, $L_j$ (last time) is the intensity level that the #j beacon 22 was driven at last time, $L_j$ (next time) is the intensity level that the #j beacon 22 will be driven at next time, and $L_{MAX}$ is the appropriate maximum (100%) intensity level to drive any beacon 22.

To ensure that this algorithm does not get stuck at L=0, and that values of Lj are not negative, or greater than $L_{MAX}$, $L_j$ (next time) is then constrained to lie between $L_{MIN}$, set prior, and $L_{MAX}$. Additionally, beacons 22 may be initially commanded to activate at full intensity in order to maximize the probability that beacons 22 are initially being used at long range.

Additionally, in one embodiment, beacons 22 may be activated at a rate of 800 Hz and the algorithm may be run each time a new output signal is generated by position sensing detector 16 in response to an optical signal 26 from beacon 22, resulting in a new estimate of beacon 22 position and orientation each time. The position and orientation measurement information may be transmitted to a flight control computer as the information arrives, for example at 800 Hz, or at some lesser rate, for example, 100 Hz, which may be the minimum update rate. At an update rate of 100 Hz, up to eight different beacons 22 may be activated between updates. If less than eight beacons 22 are available or visible, then one or more beacons 22 may be revisited between updates.

The number of beacons 22 being visited between updates may be identified as a beacon 22 set. If more than eight beacons 22 are visible, then a selection criteria may be required in order to determine which beacons 22 should be included in the current beacon 22 set. One criteria may be to evaluate recent output signals generated by position sensing detector 16 and choose those beacons 22 which resulted in the greatest position sensing detector 16 signal strengths. Another criteria may be to choose those beacons 22 that generated position sensing detector 16 output signals covering the largest area of active area 18 of position sensing detector 16, thereby improving the conditioning of the inverse model problem.

Figure 11:
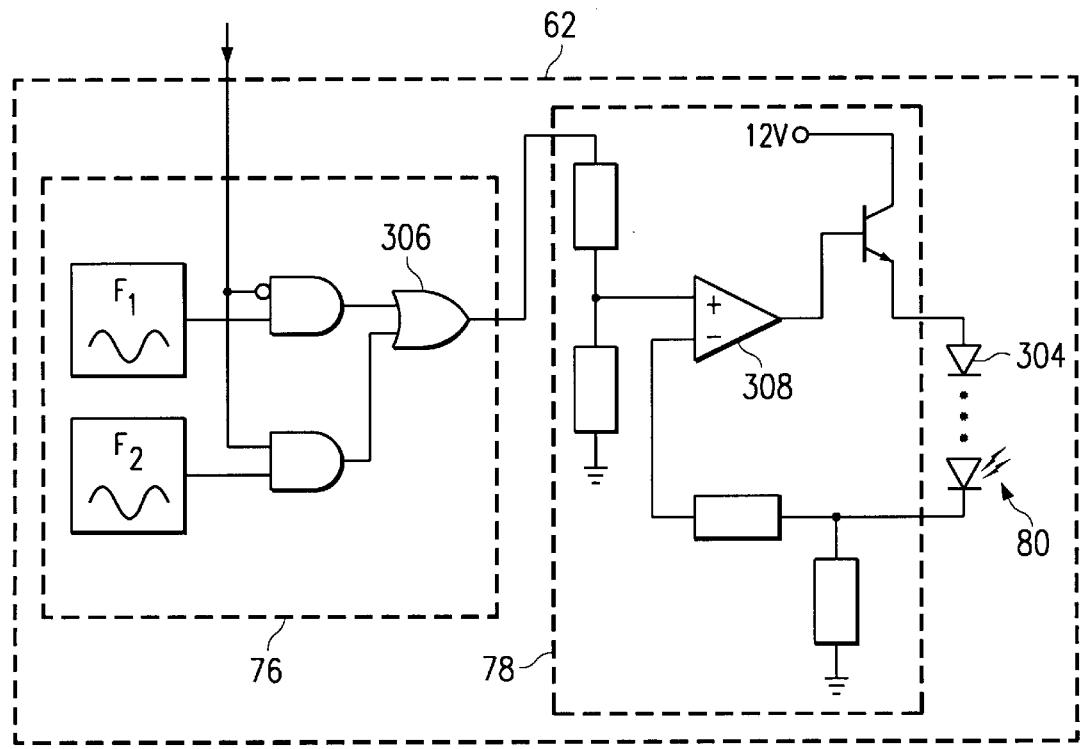
FIG. 11 is a circuit diagram illustrating a frequency modulator, a voltage-to-current amplifier and a signal generator of the system in accordance with an embodiment of the present invention.

FIG. 11 is a circuit diagram illustrating frequency modulator 76, voltage-to-current amplifier 78 and signal generator 80 of beacon control signal processing system 62 in accordance with an embodiment of the present invention. Frequency modulator 76 comprises the elements illustrated in FIG. 11 connected as illustrated in FIG. 11. Additionally, voltage-to-amplifier 78 and signal generator 80 comprise the elements illustrated in FIG. 11 and connected as illustrated in FIG. 11. In the embodiment illustrated in FIG. 11, signal generator 80 comprises a plurality of light emitting diodes 304 for generating control signals 32.

Frequency modulator 76 receives an input signal from processor 64. In one embodiment, processor 64 sets the bit rate and adds specified stop/start bits,. This data stream is then transmitted to beacon control signal processing system 62. At frequency modulator 76, two different frequency clock signals are generated, for example, $F_1$=1 MHz, and $F_2$=1.2 MHz, and the processor 64 signal selects between these using the logic circuit of modulator 76 illustrated in FIG. 11. For example, a logic level of one implies the $F_2$ signal is selected, while a logic level of zero implies that the $F_1$ signal is selected. A NOR gate 306 routes the selected clock frequency to a common path.

The signal is now in frequency shift key form and drives voltage-to-current amplifier 783 built around an operational amplifier 308 that controls the current through light emitting diodes 304. The light from light emitting diodes 304 is thus similarly modulated in frequency shift key form and is transmitted to beacon controller 28.

FIG. 12 is a circuit diagram illustrating receiver 82 in accordance with an embodiment of the present invention. As illustrated in FIG. 12, receiver 82 comprises a photodiode circuit 310 and a current-to-voltage amplifier 312. Photodiode circuit 310 and current-to-voltage amplifier 312 comprise the elements illustrated in FIG. 12 connected as illustrated in FIG. 12. In this embodiment, photodiode circuit 310 comprises a photodiode 314 to receive control signals 32 from signal generator 80.

In this embodiment, photodiode 314 is reverse biased through resistors 316 and 318 in order to increase the operating bandwidth. A capacitor 320 filters this bias signal to reduce any unwanted noise. The photodiode 314 current is passed via a capacitor 322 to amplifier 312 built around an operational amplifier 324. Capacitor 322 blocks the unwanted steady state photodiode 314 signal component and reduces unwanted low frequency components. Amplifier 312 also comprises an operational amplifier 326 to further amplify the relatively small frequency shift key signal. The output of receiver 82 is transmitted to demodulator 84.

Figure 13:
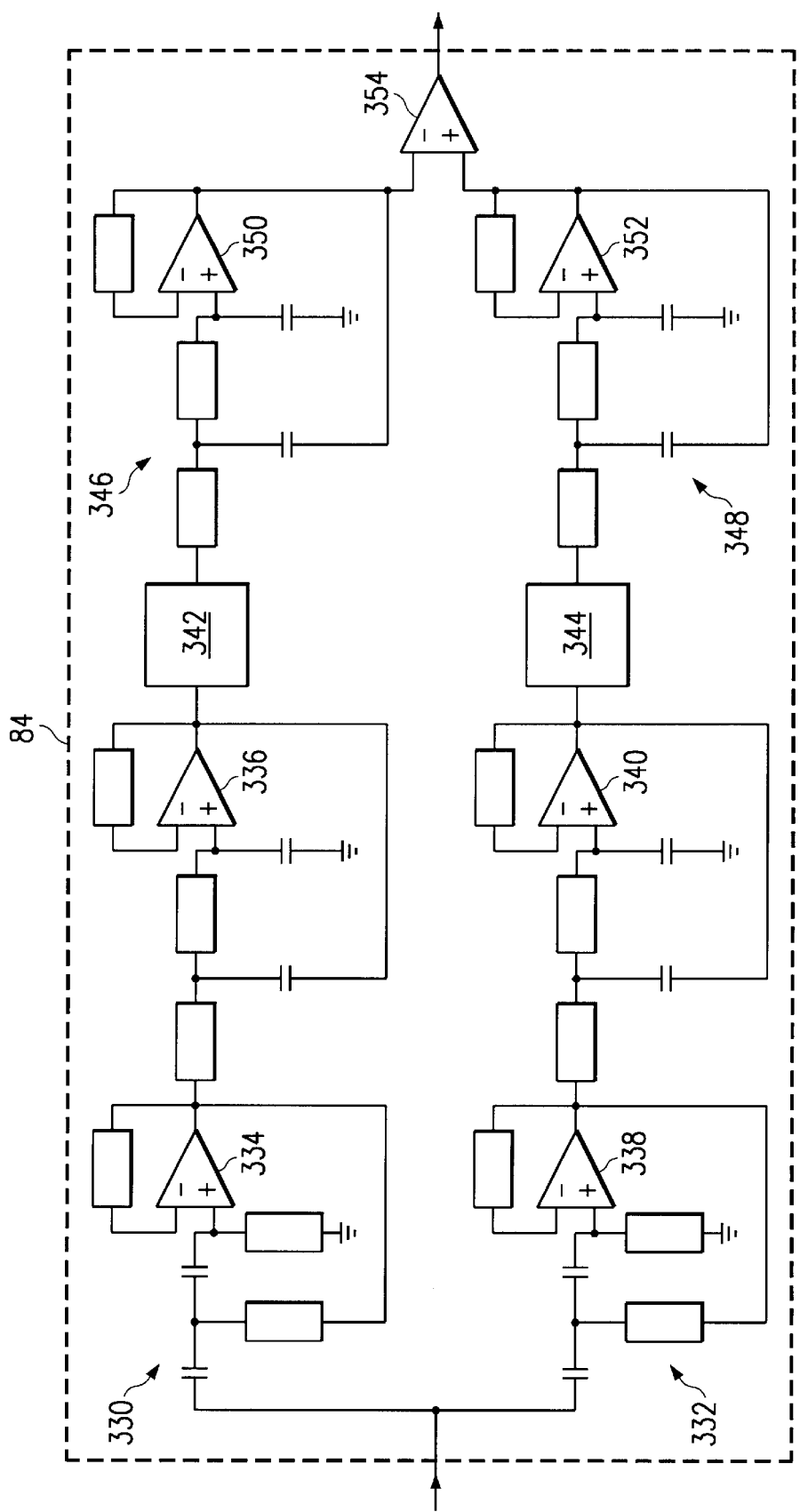
FIG. 13 is a circuit diagram illustrating a demodulator of the system in accordance with an embodiment of the present invention.

FIG. 13 is a circuit diagram illustrating demodulator 84 in accordance with an embodiment of the present invention. Demodulator 84 comprises the elements illustrated in FIG. 13 connected as illustrated in FIG. 13. Demodulator 84 demodulates the frequency shift key signal received from receiver 82 and extracts the beacon command in serial digital form along with start/stop bits. The frequency shift key signal is connected in parallel to two bandpass filters 330 and 332, filter 330 with center frequency $F_1$, and filter 332 with center frequency $F_2$. Each filter 330 and 332 illustrated in FIG. 13 comprises a fourth order Bessel bandpass filter comprising two voltage controlled voltage source (VCVS) stages. The $F_1$ filter comprises operational amplifiers 334 and 336, and the $F_2$ filter comprises operational amplifiers 338 and 340. When the frequency shift key signal oscillates at $F_1$, the signal passes through the $F_1$ filter 330 but is blocked by the $F_2$ filter 332. Similarly an $F_2$ frequency passes through the $F_2$ filter 332 but is blocked by the $F_1$ filter 330.

The filter 330 and 332 outputs are then converted to unipolar signals by rectifiers 342 and 344, respectively. The unipolar signals are then transmitted through second order Butterworth lowpass filters 346 and 348, respectively, that remove unwanted carrier frequency components. For example, filters 346 and 348 are constructed around operational amplifiers 350 and 352, respectively. The outputs of filters 346 and 348 are connected to a comparator 354 which then goes to logic zero if an $F_1$ frequency is present, or to logic one if an $F_2$ frequency is present. The signal serial stream has thus been restored and is transmitted to processor 86 of beacon controller 28.

FIG. 14 is a block diagram illustrating the processing of control signal 32 using processor 86. Processor 86 processes the signal received from demodulator 84 and controls the signal that is sent to beacons 22 for generating optical signals 26. In one embodiment, waveform generator 88 comprises a raised sinusoidal oscillator 360 operating at a frequency $F_C$ that is modulated by an analog signal from a multiplier 362 of processor 86 and transmitted to analog switch 92. A data bus 364 from processor 86 is connected to analog switch 92 to select which output $V_{B1}$ through $V_{BN}$ is to be activated, N representing the number of beacons 22 that may be activated. Thus, each output $V_{B1}$ through $V_{BN}$ is connected to a separate beacon 22.

FIG. 15 is a circuit diagram illustrating a beacon 22 in accordance with an embodiment of the present invention. The circuit of beacon 22 comprises the elements illustrated in FIG. 15 connected as illustrated in FIG. 15. In this embodiment, each beacon 22 receives a control signal voltage from analog switch 92 that is scaled by resistors 370 and 372. The scaled voltage signal is then converted to a current signal by a circuit built around operational amplifier 374 that drives light emitting diodes 376 of beacon 22. In this embodiment, when a given beacon 22 is selected by processor 86, the light emitting diode 376 current and radiated light from light emitting diode 376 will oscillate at $F_C$. Position sensing detector 16 then receives this light and processor 64 computes the direction of the beacon 22 by evaluating the output signals generated by position sensing detector 16.

Figure 16:
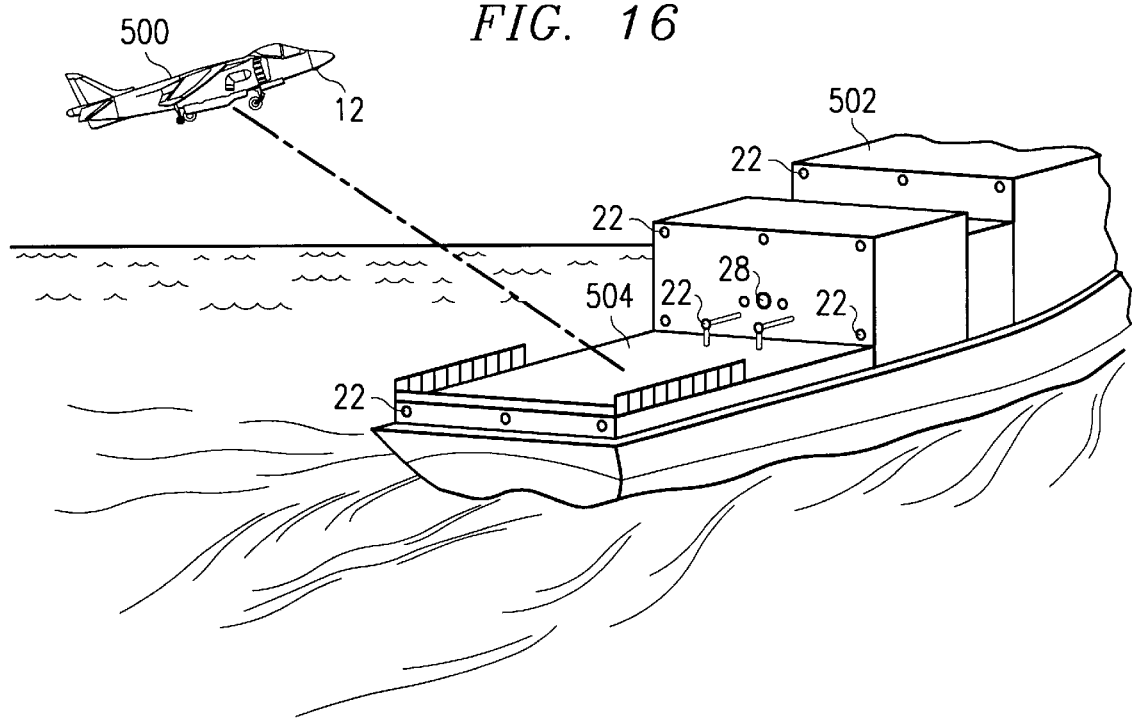
FIG. 16 is a diagram illustrating an exemplary application of an embodiment of the present invention.

FIG. 16 is a diagram illustrating an exemplary application of the present invention. FIG. 16 illustrates an unmanned aerial vehicle 500 preparing to land on a ship 502 at sea. In this application, electro-optical sensor 12 may be mounted on vehicle 500 to view beacons 22 mounted at various locations on ship 502. Beacons 22 may be located and/or sized such that particular beacons 22 may be used for greater distances, indicated generally by the larger circles designating beacons 22, and other beacons 22 may be used when vehicle 500 is within close range of ship 502, indicated generally by the smaller circles designating beacons 22.

Signal controller 30 (not explicitly shown) controls the activation and deactivation of beacons 22 by sending control signals 32 to beacon controller 28. In this example, sixteen beacons 22 are used, thereby providing redundancy and system 10 reliability. However, greater or fewer beacons 22 may be used. Additionally, only four beacons 22 need to be visible at one time in order for system 10 to determine the position and orientation of vehicle 500 relative to ship 502. The position and orientation information may be transmitted to a flight control and navigation computer of vehicle 500 for landing vehicle 500 on a flight deck 504 of ship 502.

Figure 17:
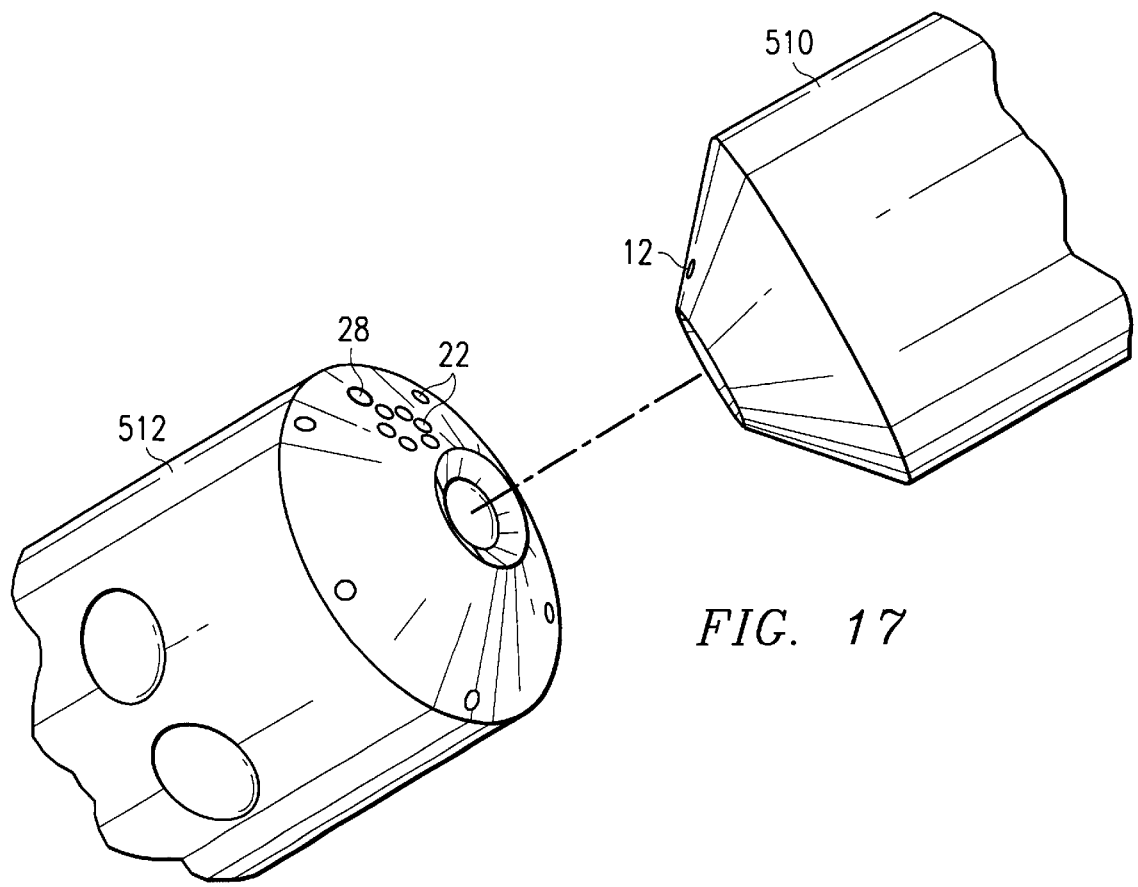
FIG. 17 is a diagram illustrating another exemplary application of an embodiment of the present invention.

FIG. 17 is a diagram illustrating another exemplary application of the present invention. In this application, a "chasing" spacecraft 510 is approaching a "target" spacecraft 512. Electro-optical sensor 12 may be disposed on spacecraft 510 to view beacons 22 disposed on spacecraft 512. As described above, beacons 22 may be located and/or sized such that particular beacons 22 may be used for greater distances, indicated generally by the larger circles designating beacons 22, and other beacons 22 may be used when spacecraft 510 is within close range of spacecraft 512, indicated generally by the smaller circles designating beacons 22.

In this example, beacon controller 28 is mounted on spacecraft 512 to receive control signals 32 from signal controller 30 (not explicitly shown) disposed on spacecraft 510. As spacecraft 510 approaches a docking distance relative to spacecraft 512, signal controller 30 may activate only beacons 22 designated generally by the smaller circles to determine position and orientation measurements of spacecraft 510 relative to spacecraft 512. The position and orientation information may transmitted to a flight control and navigation computer of spacecraft 510 for docking spacecraft 510 with spacecraft 512.

Figure 18:
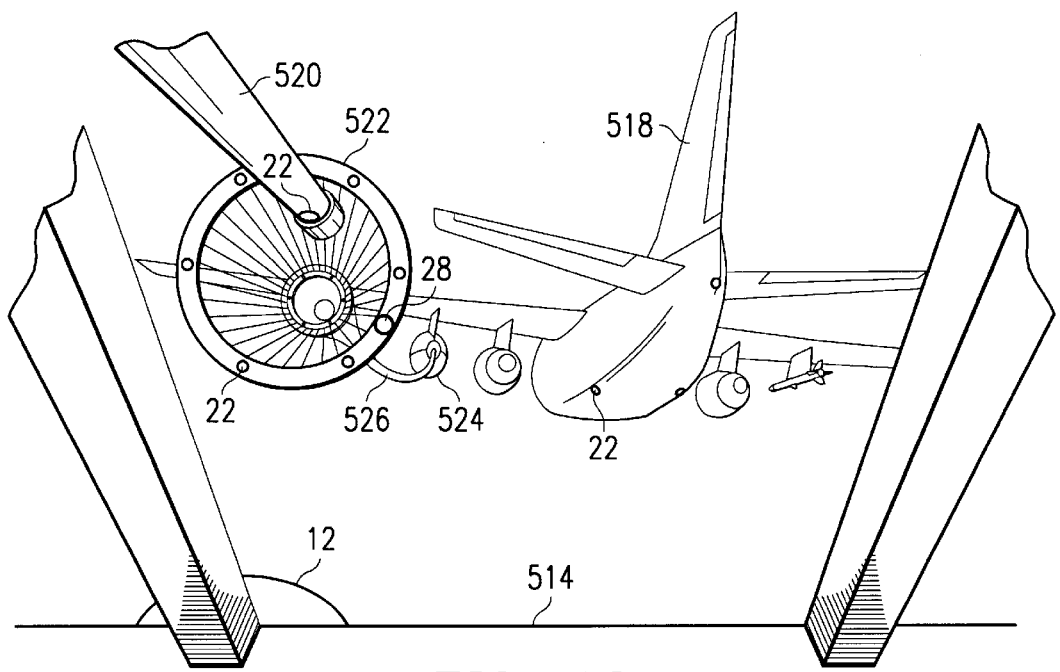
FIG. 18 is a diagram illustrating another exemplary application of an embodiment of the present invention.

FIG. 18 is a diagram illustrating another exemplary application of the present invention. FIG. 18 illustrates a view from a cockpit of an aircraft 514 about to be refueled by a tanker aircraft 518. A fuel probe 520 extends from aircraft 514 so that fuel probe 520 connects with a fuel delivery basket 522. Fuel delivery basket 522 is connected to a storage pod 524 on tanker aircraft 518 a fuel line 526.

Electro-optical sensor 12 may be mounted on aircraft 514 to view beacons 22 located on fuel delivery basket 522, fuel probe 520 and tanker aircraft 513. Beacon controller 28 may be mounted on a rim of fuel delivery basket 522 to receive control signals 32 from signal controller 30 (not explicitly shown) disposed on aircraft 514. Thus, system 10 may be used to determine a six degree-of-freedom position and orientation of aircraft 514 relative to the frame of the fuel delivery basket 522. This position and orientation information may assist the pilot in flying aircraft 514, or may be directed to a flight control computer for automatic control of aircraft 514. The position and orientation information may also be transmitted wirelessly to a receiver disposed on fuel delivery basket 522 connected to a flight control computer that governs the movement of fuel delivery basket 522 to minimize the movement of fuel delivery basket 522 during flight, such as due to wind turbulence.

Figure 19:
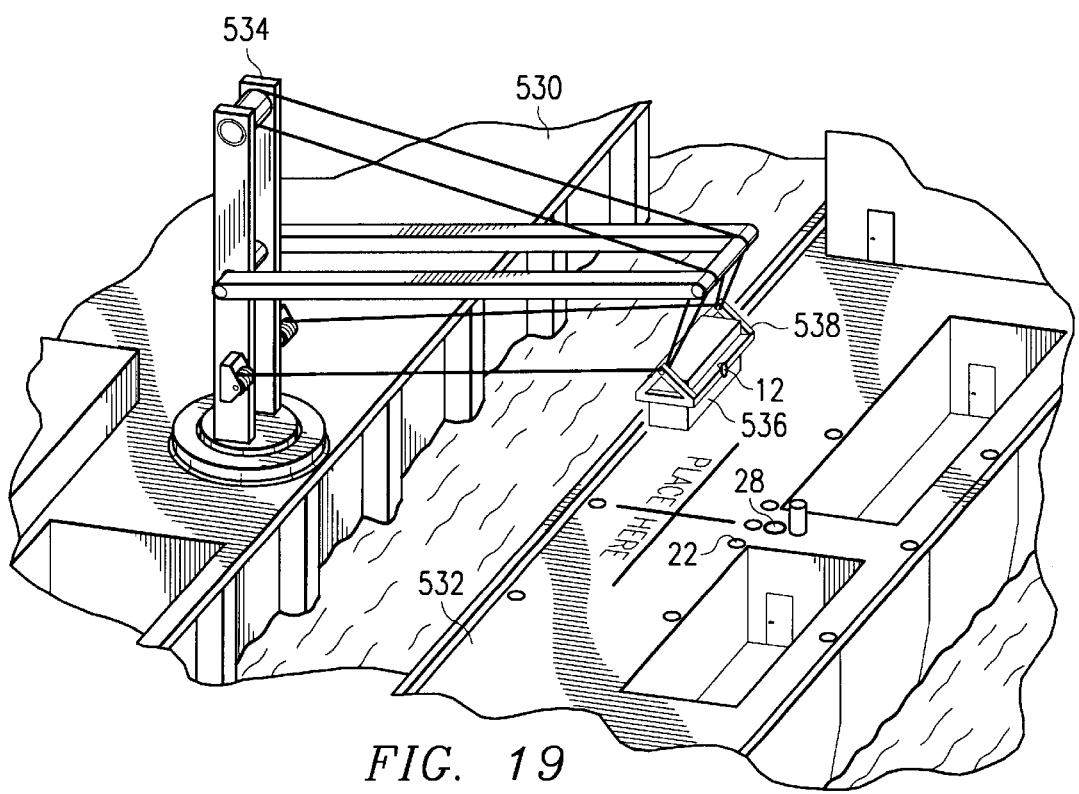
FIG. 19 is a diagram illustrating another exemplary application of an embodiment of the present invention.

FIG. 19 is a diagram illustrating another exemplary application of the present invention. This application illustrates an at-sea replenishment operation where a supply ship 530 is passing goods to a target ship 532. A crane 534 on supply ship 530 may be used to secure and direct a container 536 to target ship 532 where container 536 may be positioned and released. In this application, electro-optical sensor 12 may be mounted on a crane container bracket 538 that holds container 536. Beacon controller 28 and beacons 22 may be disposed on target ship 532. Beacon controller 28 receives control signals 32 from signal controller 30 (not explicitly shown) to direct the activation and deactivation of beacons 22 Thus, system 10 may be used to determine the six degree-of-freedom position and orientation of container 536 and crane container bracket 538 relative to target ship 532.

Figure 20:
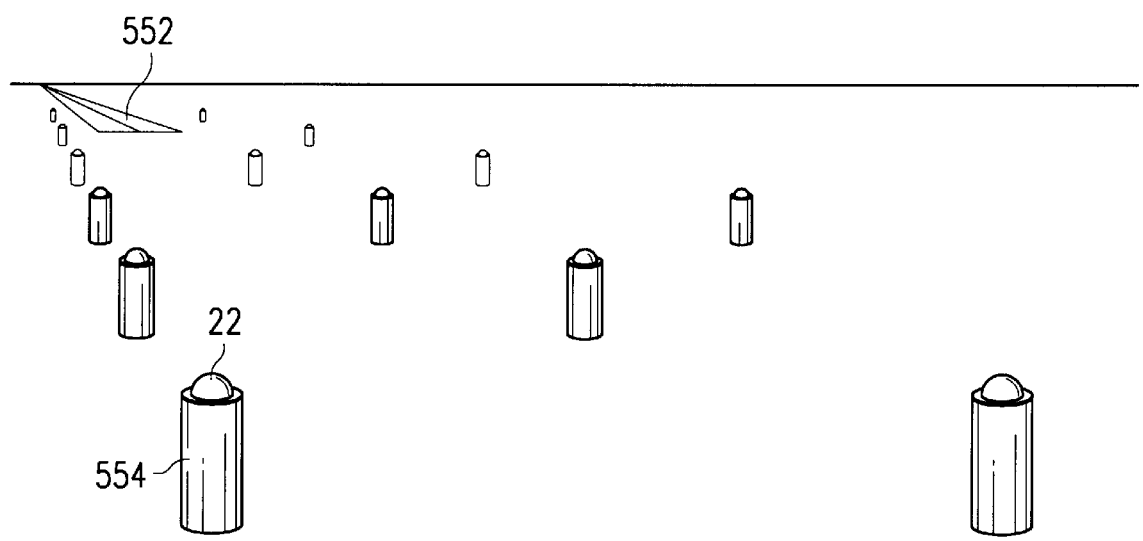
FIG. 20 is a diagram illustrating another exemplary application of an embodiment of the present invention.

FIG. 20 is a diagram illustrating another exemplary application of the present invention. In this application, an airliner 550 is preparing to land on an airport runway 552 lined with beacons 22 mounted on support pillars 554 on the ground in the flight path of aircraft 550. Electro-optical sensor 12 (not explicitly shown) may be mounted underneath aircraft 550 to view beacons 22 located below. Multiple beacon controllers 28 (not explicitly shown) may be used, each beacon controller 28 assigned to clusters of beacons 22 so that at least one beacon controller 28 would always be within the transmission range of signal controller 30 (not explicitly shown). Each beacon 22 may be assigned a unique identifier so that multiple beacons 22 would not be activated at a given time unless frequency division multiplexing of beacons 22 is used. Beacon controllers 28 may also be mounted on all or a subset of support pillars 554.

In operation, further away from runway 552, beacons 22 may be disposed wider apart to maintain and cover a wide field of view relative to elecctro-optical sensor 12 mounted on aircraft 550 as aircraft 550 descends. A wide field of view results in more accurate position and orientation estimates. Additionally, beacons 22 may be disposed to extend forward of runway 552 for up to one kilometer or more. Processor 64 may transmit position and orientation measurement information to the pilot of aircraft 550 to assist landing, and position and orientation velocities may also be computed by discrete differencing of the position and orienatation information. Additionally, more than a single electro-optical sensor 12 may be used on a single aircraft 550 in order to provide redundancy and system reliability. Multiple electro-optical sensors 12 would cooperate together transmitting a common signal to beacon controllers 28. System 10 may also be used to complement a global positioning system.

Although the present invention and the advantages thereof have been described in detail, it should be understood that various changes, substitutions, and alterations, can be made therein without departing from the spirit and scope of the present invention as defined by the appended claims.

What is claimed is:

1. A noncontact position and orientation measurement system comprising:
   at least four beacons disposed on a first object, each beacon operable to generate an optical signal;
   a beacon controller operable to activate and deactivate each of the beacons;
   an electro-optical sensor disposed on a second object and operable to generate an output signal for each optical signal received from the beacons; and
   a signal controller coupled to the electro-optical sensor and operable to determine a position and an orientation of the second object relative to the first object using the output signals generated by the electro-optical sensor, the signal controller further operable to, in response to a received optical signal, adaptively control a sequence of beacon activation and deactivation.

2. The system of claim 1, wherein the beacon controller is further operable to modulate an amplitude of the optical signals in response to a received optical signal.

3. The system of claim 1, wherein the beacon controller is further operable to modulate a frequency of the optical signals in response to a received optical signal.

4. The system of claim 1, further comprising a lens disposed between the electro-optical sensor and the beacons, the lens operable to increase a field of view relative to the electro-optical sensor.

5. The system of claim 1, wherein the signal controller is further operable to transmit a modulation signal to the beacon controller to modulate an amplitude and a frequency of the optical signals in response to a received optical signal.

6. The system of claim 5, wherein the signal controller is further operable to determine a current level of each output signal generated by the electro-optical sensor, and wherein the modulation signal regulates the amplitude of the optical signals to optimize the current level of output signals generated by the electro-optical sensor.

7. The system of claim 1, wherein each beacon comprises an array of light emitting diodes.

8. The system of claim 1, further comprising a diffuser disposed between each beacon and the electro-optical sensor, the diffusers operable to diffuse the optical signals generated by the beacons.

9. The system of claim 1, wherein the optical signals are generated by the beacons at a first amplitude, and wherein the signal controller is further operable to, in response to a received optical signal, modulate the next optical signal generated by the beacons from the first amplitude to a second amplitude.

10. The system of claim 9, wherein the optical signals are generated by the beacons at a first frequency, and wherein the signal controller is further operable to, in response to a received optical signal, modulate the next optical signal generated by the beacons from the first frequency to a second frequency.

11. A method for noncontact position and orientation measurement comprising:
   activating and deactivating each of at least four beacons disposed on a first object, each beacon operable to generate an optical signal;
   receiving the optical signals generated by each of the beacons at an electro-optical sensor disposed on a second object;
   determining a sequence of beacon activation and deactivation in response to the optical signals received at the electro-optical sensor;
   generating an output signal corresponding to each optical signal received from each beacon using the electro-optical sensor; and
   determining a position and an orientation of the second object relative to the first object using the output signals generated by the electro-optical sensor.

12. The method of claim 11, further comprising modulating an amplitude of the optical signals generated by the beacons in response to a received optical signal at the electro-optical sensor.

13. The method of claim 11, further comprising modulating a frequency of the optical signals generated by the beacons in response to a received optical signal at the electro-optical sensor.

14. The method of claim 11, further comprising transmitting a modulation signal to a beacon controller, the beacon controller operable to modulate an amplitude and a frequency of the optical signals generated by the beacons in response to a received optical signal at the electro-optical sensor.

15. The method of claim 11, further comprising:
   determining a current level of the output signals generated by the electro-optical sensor; and
   regulating an amplitude of the beacons to optimize the current level of the output signals generated by the electro-optical sensor.

16. The method of claim 15, further comprising transmitting the optical signals generated by the beacons through a lens disposed between the beacons and the electro-optical sensor to focus the optical signals on the electro-optical sensor.

17. The method of claim 11, further comprising passing the optical signals through a diffuser disposed between the beacons and the electro-optical sensor to diffuse the optical signals.

18. The method of claim 11, further comprising modulating an amplitude of a next optical signal generated by one of the at least four beacons in response to a received optical signal at the electro-optical sensor.

19. The method of claim 18, further comprising modulating a frequency of the next optical signal generated by one of the at least four beacons in response to the received optical signal at the electro-optical sensor.

20. A noncontact position measurement system comprising:
   a plurality of beacons disposed on a first object, each beacon operable to generate an optical signal;
   a beacon controller coupled to the plurality of beacons operable to activate and deactivate each beacon;
   an electro-optical sensor disposed on a second object and operable to generate an output signal for each optical signal received from each beacon; and
   a signal controller coupled to the electro-optical sensor and operable to transmit a beacon control signal to the beacon controller to control a sequence of beacon activation and deactivation in response to an output signal generated by the electro-optical sensor.

21. The system of claim 20, wherein the beacon controller is operable to modulate an intensity of the optical signals generated by the beacons in response to the output signal generated by the electro-optical sensor.

22. The system of claim 20, wherein the beacon controller is operable to activate at least two of the plurality of beacons simultaneously.

23. The system of claim 22, wherein the electro-optical sensor comprises a filter to discriminate between the optical signals generated by the simultaneously activated beacons.

24. The system of claim 22, wherein the signal controller is operable to discriminate between the optical signals generated by the simultaneously activated beacons.

25. The system of claim 24, wherein the signal controller discriminates between the simultaneously activated beacons via frequency demultiplexing of the optical signals generated by the simultaneously activated beacons.

26. The system of claim 20, wherein the optical signals are generated by the beacons at a first amplitude, and wherein the signal controller is further operable to transmit a beacon control signal to the beacon controller to modulate a next optical signal generated by the beacons from the first amplitude to a second amplitude.

27. The system of claim 26, wherein the optical signals are generated by the beacons at a first frequency, and wherein the signal controller is further operable to transmit a beacon control signal to the beacon controller to modulate a next optical signal generated by the beacons from the first frequency to a second frequency.

28. A noncontact position and orientation measurement system comprising:
   a first set of beacons disposed on a first object;
   a second set of beacons disposed on the first object, each beacon of the first and second beacon sets operable to generate an optical signal;
   a beacon controller operable to activate and deactivate each of the beacons of the first and second beacon sets;
   an electro-optical sensor disposed on a second object and operable to generate an output signal for each optical signal received from the beacons of the first and second beacon sets; and a signal controller coupled to the electro-optical sensor and operable to determine a position and an orientation of the second object relative to the first object using the output signals generated by the electro-optical sensor, the position and the orientation determined using the optical signals generated by the first beacon set at a first distance between the second object and the first object, the position and the orientation determined using the optical signals generated by the second beacon set at a second distance between the second object and the first object, the second distance different than the first distance.

29. The system of claim 28, wherein the signal controller is further operable to transmit a modulation signal to the beacon controller, the modulation signal operable to modulate an amplitude of a next optical signal generated by one of the beacons of the first and second beacon sets.

30. The system of claim 29, wherein the amplitude of the next optical signal is determined in response to a received optical signal at the electro-optical sensor.

31. The system of claim 29, wherein the modulation signal is further operable to control a frequency of the next optical signal generated by one of the beacons of the first and second beacon sets.

32. The system of claim 31, wherein the frequency of the next optical signal is determined in response to the received optical signal at the electro-optical sensor.

33. The system of claim 28, wherein the signal controller is further operable to determine a sequence of activation and deactivation of the beacons of the first and second beacon sets in response to a received optical signal at the electro-optical sensor.

34. A noncontact position and orientation measurement system comprising:

at least four beacons disposed on a first object, each beacon operable to generate an optical signal;

a beacon controller operable to activate and deactivate each of the beacons;

an electro-optical sensor disposed on a second object and operable to generate an output signal for each optical signal received from the beacons; and a signal controller coupled to the electro-optical sensor and operable to determine a position and an orientation of the second object relative to the first object using the output signals generated by the electro-optical sensor, the signal controller further operable to, in response to a received optical signal, adaptively modify a characteristic of a subsequent optical signal generated by one of the at least four beacons.

35. The system of claim 34, wherein the characteristic of the subsequent optical signal comprises an amplitude of the subsequent optical signal.

36. The system of claim 34, wherein the characteristic of the subsequent optical signal comprises a frequency of the subsequent optical signal.

37. The system of claim 34, wherein the characteristic of the subsequent optical signal comprises an amplitude and a frequency of the subsequent optical signal.

38. The system of claim 34, wherein the signal controller is further operable to determine a current level associated with each output signal generated by the electro-optical sensor, and wherein the signal controller is further operable to modify the characteristic of the subsequent optical signal to optimize the current level of the subsequent optical signal.

39. The system of claim 34, wherein the signal controller is further operable to modify a sequence of beacon activation and deactivation for generating the subsequent optical signal.

40. A method for noncontact position and orientation measurement comprising:

receiving an optical signal from each of at least four beacons at an electro-optical sensor, the beacons disposed on a first object, the electro-optical sensor disposed on a second object;

in response to receiving an optical signal from one of the beacons, modifying a characteristic of a subsequent optical signal generated by another one of the beacons;

generating an output signal corresponding to each optical signal received from each beacon using the electro-optical sensor; and determining a position and an orientation of the second object relative to the first object using the output signals generated by the electro-optical sensor.

41. The method of claim 40, wherein modifying the characteristic comprises modifying an amplitude of the subsequent optical signal.

42. The method of claim 40, wherein modifying the characteristic comprises modifying a frequency of the subsequent optical signal.

43. The method of claim 40, wherein modifying the characteristic comprises modifying an amplitude and a frequency of the subsequent optical signal.

44. The method of claim 40, further comprising modifying a sequence of beacon activation and deactivation for generating the optical signals in response to receiving an optical signal from one of the beacons.

45. The method of claim 40, wherein modifying the characteristic comprises modifying the characteristic of a next optical signal generated by one of the beacons.

* * * * *

UNITED STATES PATENT AND TRADEMARK OFFICE
CERTIFICATE OF CORRECTION

PATENT NO. : 6,266,142 B1
DATED : July 24, 2001
INVENTOR(S) : John L. Junkins et al.

It is certified that error appears in the above-identified patent and that said Letters Patent is hereby corrected as shown below:

Title page,
Item [75], Inventors, after "Junkins", delete "Delcan", and insert -- Declan --.
Item [57], ABSTRACT,
Line 9, after "signal", delete "con-roller", and insert -- controller --.

Figure 9A:
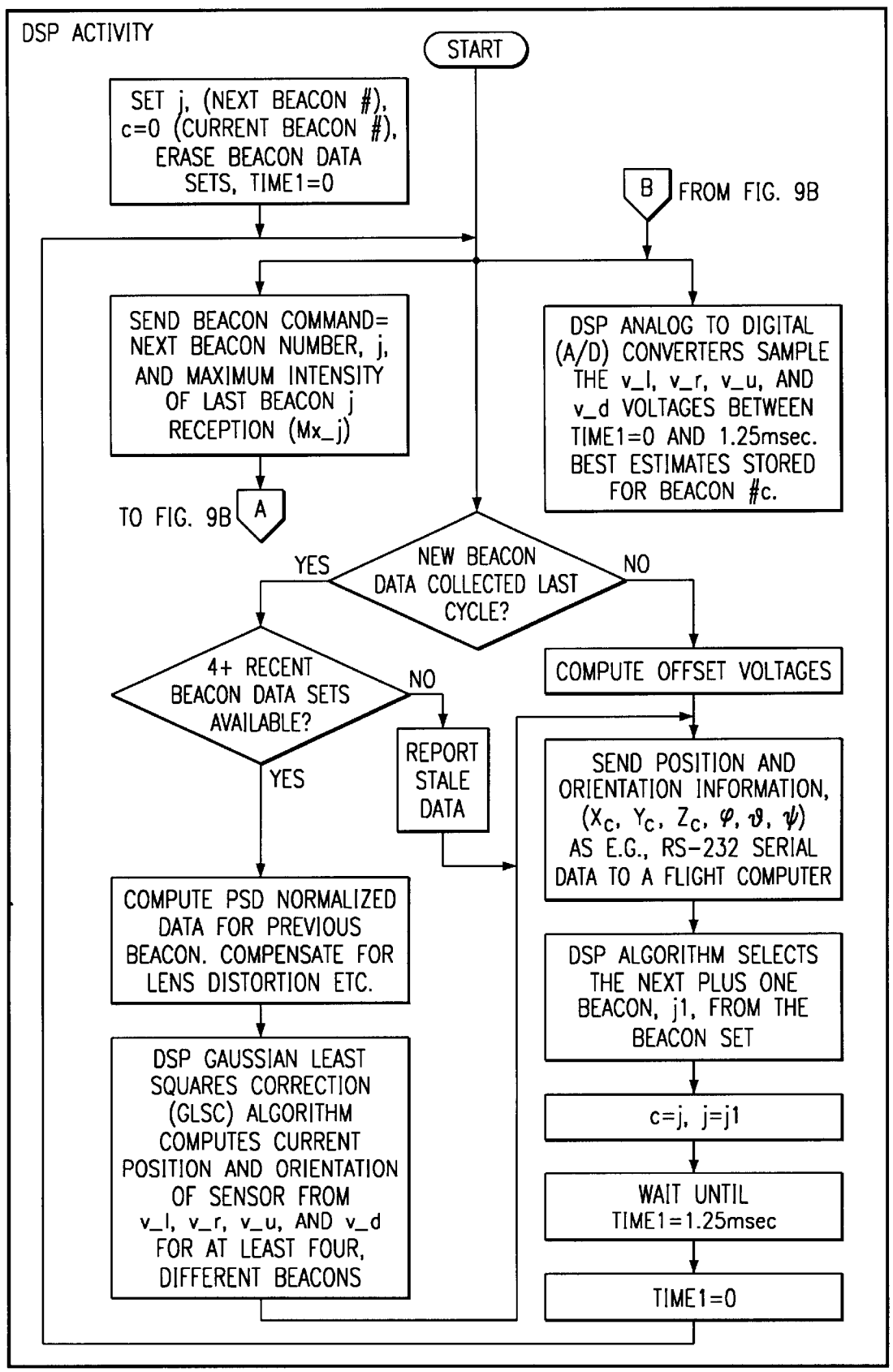
FIGS. 9A x 9B are a flow diagram of a method for noncontact position and measurement system in accordance with an embodiment of the present invention.
Figure 9B:
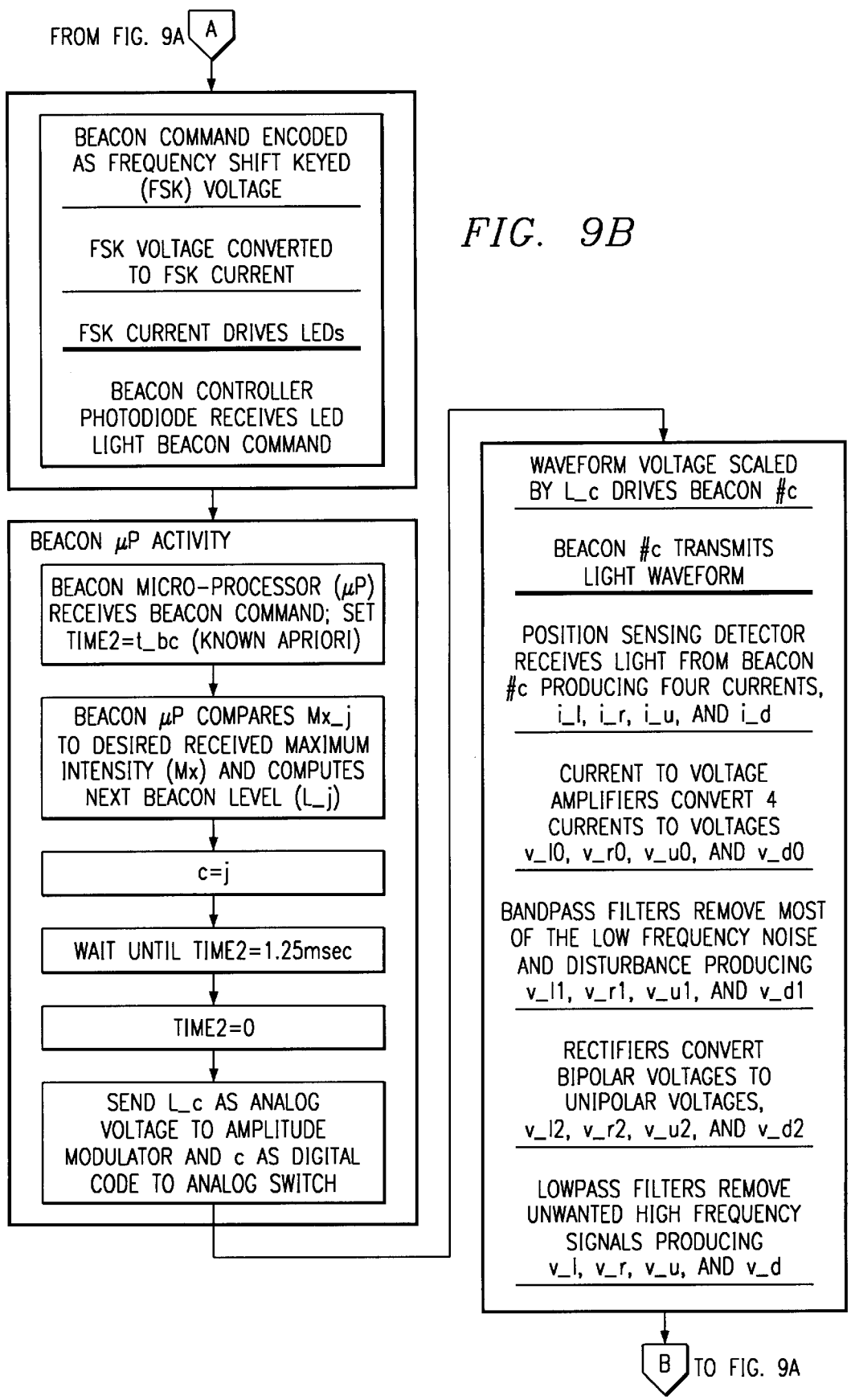

Column 3,
Line 23, delete "FIGS 9A x 9B are a flow diagram", and insert -- FIGS. 9A - 9B are flow diagrams --.

Column 5,
Line 53, after "generators", delete "46", and insert -- 44 --.

Column 8,
Line 42, after "or", delete "Less", and insert -- less --.

Column 9,
Line 66, delete "Fig. 9", and insert -- Figs 9A -- 9B --.

Column 10,
Line 2, after the first "in", delete "FIG. 9", and insert -- FIGS. 9A - 9B --.
Line 3, after the first "in", delete "FIG. 9", and insert -- FIGS.. 9A - 9B --.
Formula (2), that portion of the formula reading $$= \frac{y_o - fC_{21}(X_i - X_c) + C_{22}(Y_i - Y_c) + C_{23}(Z_i - Z_c)}{C_{11}(X_i - X_c) + C_{12}(Y_i - Y_c) + C_{13}(Z_i - Z_c)}$$

should read $$= y_o - f[C_{21}(X_i - X_c) + C_{22}(Y_i - Y_c) + C_{23}(Z_i - Z_c)]/[C_{11}(X_i - X_c) + C_{12}(Y_i - Y_c) + C_{13}(Z_i - Z_c)]$$

Formula (3), that portion of the formula reading $$= \frac{z_o - fC_{31}(X_i - X_c) + C_{32}(Y_i - Y_c) + C_{33}(Z_i - Z_c)}{C_{11}(X_i - X_c) + C_{12}(Y_i - Y_c) + C_{13}(Z_i - Z_c)}$$

$$= z_o - f[C_{31}(X_i - X_c) + C_{32}(Y_i - Y_c) + C_{33}(Z_i - Z_c)]/[C_{11}(X_i - X_c) + C_{12}(Y_i - Y_c) + C_{13}(Z_i - Z_c)]$$

UNITED STATES PATENT AND TRADEMARK OFFICE
CERTIFICATE OF CORRECTION

PATENT NO.    : 6,266,142 B1
DATED         : July 24, 2001
INVENTOR(S)   : John L. Junkins et al.

It is certified that error appears in the above-identified patent and that said Letters Patent is hereby corrected as shown below:

Column 11,
Line 26, after "sensing" delete "defector", and insert -- detector --.
Line 62, after "equations", delete ".".

Column 12,
Line 5, after "of", delete "Chebyshe-v", and insert -- Chebyshev --.

Column 13,
Line 35, after "amplifier", delete "783", and insert -- 78 --.

Column 15,
Line 38, after "aircraft", delete "513", and insert -- 518 --.

Column 16,
Line 19, after "to", delete " elecctro-optical", and insert -- electro-optical --.
Line 27, after "and", delete "orienatation", and insert -- orientation --.

Signed and Sealed this

Sixteenth Day of July, 2002

*Attest:*

JAMES E. ROGAN
*Attesting Officer*    *Director of the United States Patent and Trademark Office*